(12) United States Patent
Kim et al.

(10) Patent No.: US 11,011,138 B2
(45) Date of Patent: May 18, 2021

(54) MOBILE TERMINAL AND CONTROL METHOD THEREOF

(71) Applicant: LG ELECTRONICS INC., Seoul (KR)

(72) Inventors: Jaewoon Kim, Seoul (KR); Seungjae Lee, Seoul (KR); Kyueun Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 181 days.

(21) Appl. No.: 14/755,875

(22) Filed: Jun. 30, 2015

(65) Prior Publication Data

US 2016/0148598 A1 May 26, 2016

(30) Foreign Application Priority Data

Nov. 21, 2014 (KR) ........................ 10-2014-0163707

(51) Int. Cl.
| | | |
|---|---|---|
| *G09G 5/14* | (2006.01) | |
| *G06F 3/0481* | (2013.01) | |
| *G06F 3/0484* | (2013.01) | |
| *H04M 1/72403* | (2021.01) | |
| *G06F 3/041* | (2006.01) | |

(Continued)

(52) U.S. Cl.
CPC ............ *G09G 5/14* (2013.01); *G06F 3/0412* (2013.01); *G06F 3/0481* (2013.01);
(Continued)

(58) Field of Classification Search
CPC .. G09G 2340/10; G09G 5/14; G09G 2354/00; G09G 2340/12; H04M 1/72403;
(Continued)

(56) References Cited

U.S. PATENT DOCUMENTS 8,875,018 B2 * 10/2014 Jeong .................... G06F 3/0481
715/702
9,043,715 B2 * 5/2015 Nolterieke ............ G06F 9/4443
715/768
(Continued)

FOREIGN PATENT DOCUMENTS

| CN | 101268437 | 9/2008 |
|---|---|---|
| KR | 20110037040 | 4/2011 |
| KR | 20130078236 | 7/2013 |

OTHER PUBLICATIONS

European Patent Office Application No. 15186792.6, Search Report dated Apr. 6, 2016, 8 pages.

(Continued)

*Primary Examiner* — Jeff Piziali
(74) *Attorney, Agent, or Firm* — Lee Hong Degerman Kang & Waimey

(57) ABSTRACT

A terminal and a control method for simultaneously executing a plurality of applications are provided. The mobile terminal includes a display unit to output a first screen and a second screen overlapping at least a portion the first screen as a higher screen than the first screen and a control unit to control transparency based on occurrence of a preset event of at least a first region of the first screen on which an object corresponding to the preset event is output or a second region of the second screen overlapping the first region according to a preset scheme.

11 Claims, 15 Drawing Sheets

(51) Int. Cl.
  *G06F 3/0488* (2013.01)
  *G06F 3/14* (2006.01)
  *H04M 1/7243* (2021.01)
  *H04M 1/72484* (2021.01)

(52) U.S. Cl.
  CPC ...... *G06F 3/04842* (2013.01); *G06F 3/04883* (2013.01); *G06F 3/14* (2013.01); *H04M 1/72403* (2021.01); *G06F 2203/04108* (2013.01); *G06F 2203/04804* (2013.01); *G06F 2203/04808* (2013.01); *G09G 2340/10* (2013.01); *G09G 2340/12* (2013.01); *G09G 2354/00* (2013.01); *H04M 1/7243* (2021.01); *H04M 1/72484* (2021.01); *H04M 2250/22* (2013.01)

(58) Field of Classification Search
  CPC ........... H04M 1/7243; H04M 1/72484; H04M 2250/22; G06F 3/0481; G06F 3/04842; G06F 3/0412; G06F 3/04883; G06F 3/14; G06F 2203/04804; G06F 2203/04108; G06F 2203/04808; G06F 9/451; G06F 3/04812
  See application file for complete search history.

(56) References Cited

U.S. PATENT DOCUMENTS

| | | | |
|---|---|---|---|
| 2004/0054646 A1* | 3/2004 | Daniell | G06Q 10/107 |
| 2006/0242607 A1* | 10/2006 | Hudson | G06F 3/04817 715/863 |
| 2007/0067798 A1* | 3/2007 | Wroblewski | G06F 3/0346 725/37 |
| 2008/0195969 A1* | 8/2008 | Brown | G06F 3/0486 715/802 |
| 2009/0031237 A1 | 1/2009 | Jessen et al. | |
| 2009/0138811 A1 | 5/2009 | Horiuchi et al. | |
| 2010/0269030 A1* | 10/2010 | Mr. Dugonjic | G06Q 30/02 715/207 |
| 2010/0323762 A1* | 12/2010 | Sindhu | G06F 1/1613 455/566 |
| 2011/0069017 A1* | 3/2011 | Victor | G06F 3/0482 345/173 |
| 2011/0087964 A1* | 4/2011 | Patterson | G06F 3/165 715/716 |
| 2011/0107212 A1 | 5/2011 | Jeong | |
| 2011/0187655 A1* | 8/2011 | Min | G06F 1/1643 345/173 |
| 2012/0311473 A1 | 12/2012 | Nolterieke et al. | |
| 2014/0157162 A1* | 6/2014 | Chaudhri | G06F 3/0481 715/768 |

OTHER PUBLICATIONS

State Intellectual Property Office of the People's Republic of China Application Serial No. 201510760168.7, Office Action dated Mar. 30, 2018, 15 pages.
Korean Intellectual Property Office Application Serial No. 10-2014-0163707, Office Action dated Dec. 14, 2020, 5 pages.

* cited by examiner

MOBILE TERMINAL AND CONTROL METHOD THEREOF

CROSS-REFERENCE TO RELATED APPLICATION

Pursuant to 35 U.S.C. § 119(a), this application claims the benefit of earlier filing date and right of priority to Korean Application No. 10-2014-0163707, filed on Nov. 21, 2014, the contents of which is incorporated by reference herein in its entirety.

FIELD OF THE INVENTION

The present invention relates to a mobile terminal capable of executing a plurality of applications and a control method thereof.

BACKGROUND OF THE INVENTION

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As functions of terminals become more diversified, terminals are implemented in the form of a multimedia player including composite functions such as capturing images or video, reproducing music or video files, playing games, receiving broadcast signals, and the like.

Efforts are ongoing to support and increase the functionality of mobile terminals. Such efforts include software and hardware improvements, as well as changes and improvements in the structural components.

A plurality of applications can be simultaneously executed in independent screen windows (or layers).

However, when a plurality of screen windows are simultaneously output, some regions overlap each other. Also, in order to check contents of the overlapped regions, transparency of the entire screen window should be adjusted.

SUMMARY OF THE INVENTION

In one aspect of the present invention, a mobile terminal is provided. The mobile terminal includes a display unit configured to display a first screen and a second screen, the second screen a higher screen than the first screen and overlapping at least a portion the first screen and a control unit configured to control transparency of at least a first region of the first screen on which an object corresponding to the preset event is displayed or transparency of a second region of the second screen that overlaps the first region such that the object is visible through the second region, the control based on occurrence of a preset event and according to a preset scheme.

It is contemplated that the preset event includes receipt of a message and display of the received message on the first region of the first screen. It is further contemplated that the preset event includes a user input for displaying a new object on the first region of first screen.

It is contemplated that controlling the transparency includes controlling transparency of at least one of a plurality of first regions of the first screen on which an object related to the new object is displayed or transparency of one of a plurality of second regions of the second screen that overlaps the one of a plurality of first regions of the first screen. It is further contemplated that the preset event includes a user input for creating and displaying a message on the first region of the first screen.

It is contemplated that controlling the transparency includes controlling transparency of at least one of a plurality of first regions of the first screen on which sent and received messages are displayed before the created message is displayed or transparency of one of a plurality of second regions of the second screen that overlaps the one of a plurality of first regions of the first screen. It is further contemplated that the preset event includes a user input for selecting an object displayed on the first region of the first screen.

It is contemplated that the preset event includes a user input for selecting an object displayed on the second screen and displaying the selected object on the first region of the first screen. It is further contemplated that the preset event includes application of a touch input for displaying a new object on the first region of the first screen to a region of overlap between the first screen and second screen.

It is contemplated that the preset event includes application of a touch input for controlling the second screen to a region of overlap between the first screen and second screen and the control unit is further configured to execute a control operation corresponding to the touch input. It is further contemplated that the preset event includes detection and display of an object on the first region of the first screen, the object related to an object displayed on the second screen.

It is contemplated that the control unit is further configured to detect a touch input applied to the related object and further control the transparency of least the first screen or the second screen according to the preset scheme in response to detecting the touch input.

In another aspect of the present invention, a method for controlling a mobile terminal is provided. The method includes displaying a first screen and a second screen on a display unit, the second screen a higher screen than the first screen and overlapping at least a portion the first screen and controlling transparency of at least a first region of the first screen on which an object corresponding to the preset event is displayed or transparency of a second region of the second screen that overlaps the first region such that the object is visible through the second region, the control based on occurrence of a preset event and according to a preset scheme.

It is contemplated that the preset event includes receipt of a message and display of the received message on the first region of the first screen. It is further contemplated that the preset event includes a user input for displaying a new object on the first region of first screen.

It is contemplated that controlling the transparency includes controlling transparency of at least one of a plurality of first regions of the first screen on which an object is related to the new object displayed or transparency of one of a plurality of second regions of the second screen that overlaps the one of a plurality of first regions of the first screen. It is further contemplated that the preset event includes a user input for selecting an object displayed on the first region of the first screen.

It is contemplated that the preset event includes a user input for selecting an object displayed on the second screen and displaying the selected object on the first region of the first screen. It is further contemplated that the preset event includes detection and display of an object on the first region of the first screen, the object related to an object displayed on the second screen.

It is contemplated that the method further includes detecting a touch input applied to the related object and further controlling the transparency of least the first screen or the second screen according to the preset scheme in response to detecting the touch input.

Further scope of applicability of the present invention will become more apparent from the detailed description herein. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1A:
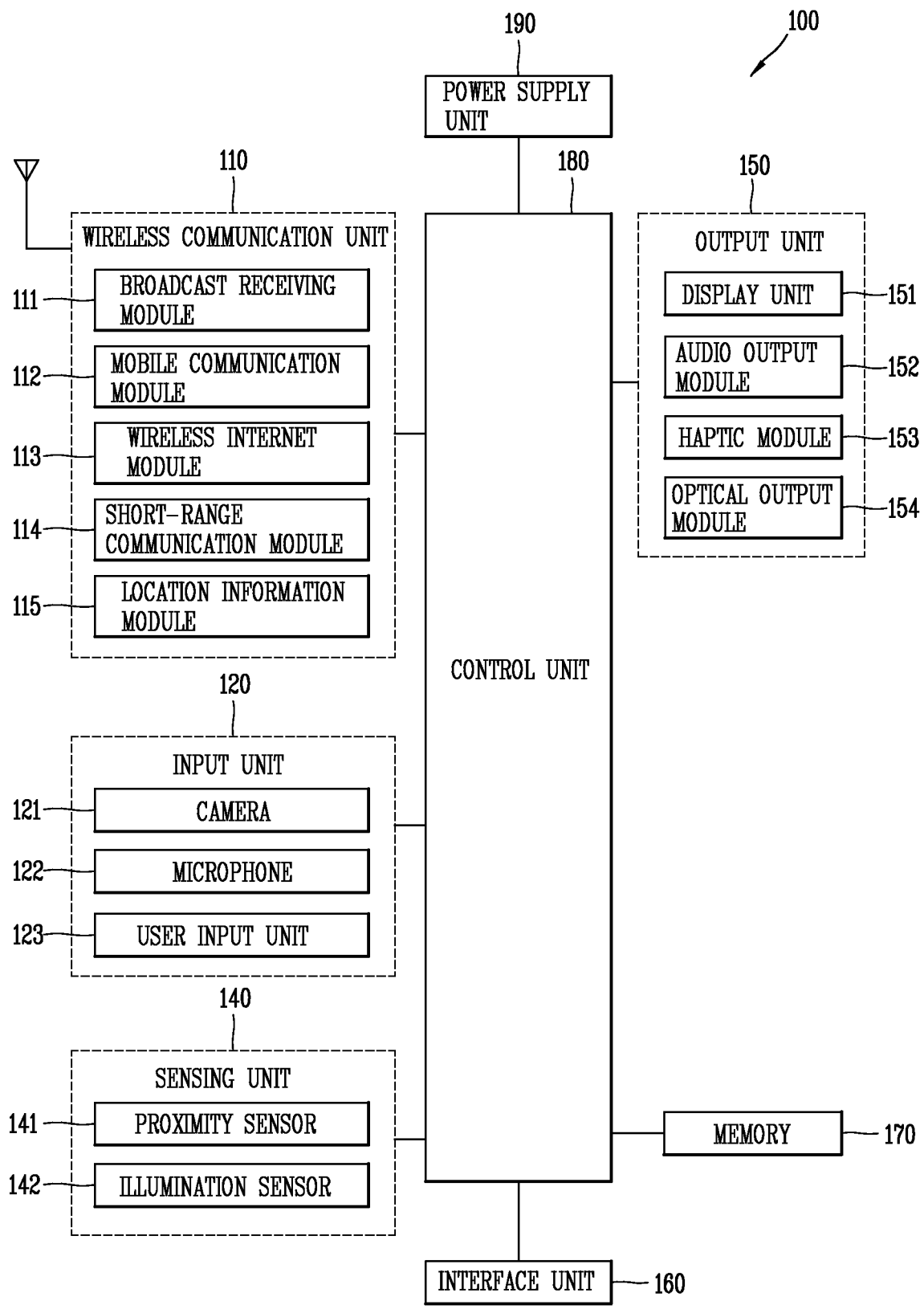
FIG. 1A is a block diagram of a mobile terminal according to an exemplary embodiment of the present invention.

Description will now be given in detail according to exemplary embodiments of the present invention, with reference to the accompanying drawings. For the sake of brief description with reference to the drawings, the same or equivalent components may be provided with the same or similar reference numbers, and their description will not be repeated. In general, a suffix such as "module" and "unit" may be used to refer to elements or components. Use of such a suffix herein is merely intended to facilitate description of the invention, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless the plural representation represents a definitely different meaning from the context.

Terms such as "include" or "has" are used herein and should be understood that they are intended to indicate an existence of several components, functions or steps, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
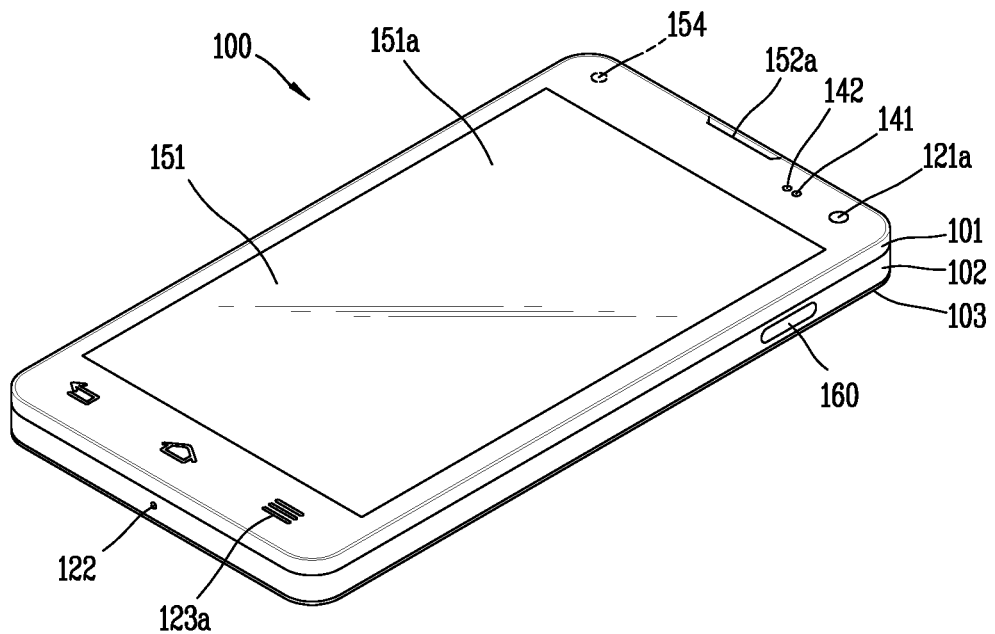
FIGS. 1B and 1C are conceptual views of one example of the mobile terminal, viewed from different directions.
Figure 1C:
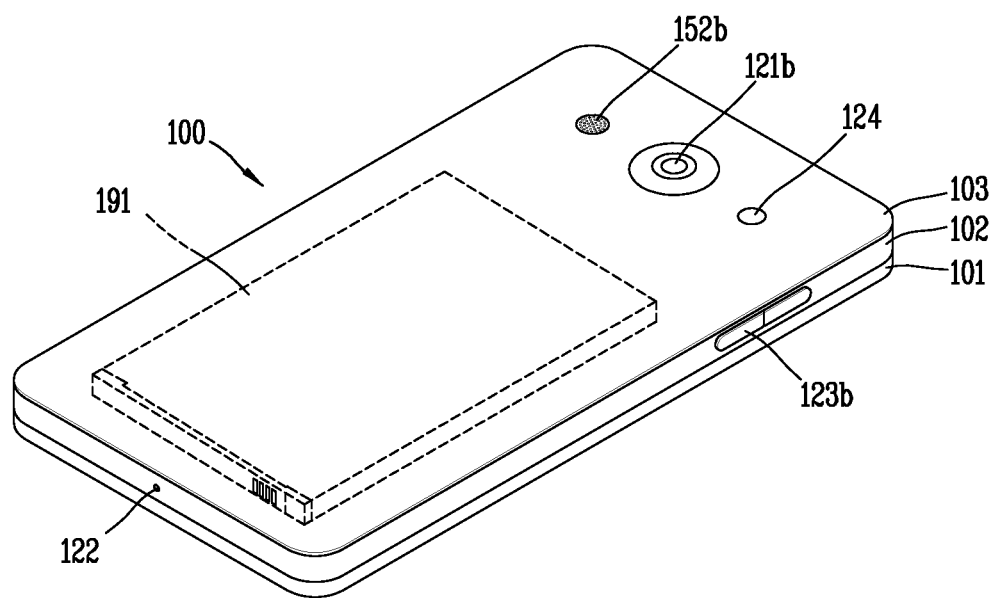

Reference is now made to FIGS. 1A-1C, where FIG. 1A is a block diagram of a mobile terminal in accordance with the present invention, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a control unit 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

The broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee™, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch and proximity touch patterns (for example, distance, direction, speed, time, position, moving status, and the like). In general, control unit 180 processes data corresponding to proximity touches and proximity touch patterns sensed by the proximity sensor 141 and causes output of visual information on the touch screen. In addition, the control unit 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which region of the display unit 151 has been touched. Here, the touch controller may be a component separate from the control unit 180, the control unit 180, and combinations thereof.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

The haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

The optical output module 154 can output a signal for indicating an event generation using a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage via which various command signals input by the user from the cradle are transferred to the mobile terminal. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in conjunction with a network storage device that performs the storage function of the memory 170 over a network, such as the Internet.

The control unit 180 may typically control the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images. In addition, the control unit 180 can control one or a combination of those components in order to implement various exemplary embodiments disclosed herein.

The power supply unit 190 receives external power or provides internal power in order to supply the appropriate power required for operating elements and components included in the mobile terminal 100. The power supply unit 190 may include a battery, which is typically rechargeable or detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two or more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted in the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the first audio output module 152a, the second audio output module 152b, the proximity sensor 141, the illumination sensor 142, the optical output module 154, the first camera 121a, the second camera 121b, the first manipulation unit 123a, the second manipulation unit 123b, the microphone 122, the interface unit 160, etc.

Hereinafter, the mobile terminal 100 will be explained with reference to FIGS. 1B and 1B. The display unit 151, the first audio output module 152a, the proximity sensor 141, the illumination sensor 142, the optical output module 154, the first camera 121a and the first manipulation unit 123a are arranged on the front surface of the terminal body. The second manipulation unit 123b, the microphone 122 and the interface unit 160 are arranged on the side surfaces of the terminal body. The second audio output module 152b and the second camera 121b are arranged on the rear surface of the terminal body.

However, it is to be understood that alternative arrangements are possible and within the teachings of the instant disclosure. Some components may be omitted or rearranged. For example, the first manipulation unit 123a may be located on another surface of the terminal body and the second audio output module 152b may be located on the side surface of the terminal body.

The display unit 151 outputs information processed in the mobile terminal 100. For example, the display unit 151 may display information on an execution screen of an application program driven in the mobile terminal 100, or a User Interface (UI) or a Graphic User Interface (GUI) associated with such execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other or these devices may be integrated or arranged on different surfaces.

The display unit 151 may also include a touch sensor which senses a touch input received at the display unit. When a touch is input to the display unit 151, the touch sensor may be configured to sense this touch and the control unit 180, for example, may generate a control command or other signal corresponding to the touch. The content which is input in the touching manner may be a text, a numerical value or a menu item which can be indicated or designated in various modes.

The touch sensor may be configured in a form of a film having a touch pattern and may be disposed between the window 151a and a display on a rear surface of the window 151a or in a form of a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output unit 152a may be implemented as a receiver for transmitting a call sound to a user's ears and the second audio output unit 152b may be implemented as a loud speaker for outputting each type of alarm sounds or a play sound of multimedia.

A configuration may be provided in which the sounds generated from the first audio output module 152a are released along an assembly gap between the structural bodies (e.g., between the window 151a and the front case 101). In this case, a hole independently formed to output audio sounds may not be seen or hidden in terms of appearance, thereby further simplifying the appearance of the mobile terminal 100.

The optical output module 154 can output a signal for indicating an event generation using a light source. Examples of events generated in the mobile terminal 100 may include message reception, call signal reception, a missed call, an alarm, a schedule notice, an email reception, information reception through an application, and the like. A signal output by the optical output module 154 may be implemented in such a manner that the mobile terminal emits monochromatic light or light with a plurality of colors.

The signal output may be terminated as the mobile terminal senses that a user has checked the generated event, for example.

The first camera 121a processes image data of still pictures or video acquired by an image capture device in a video capturing mode or an image capturing mode. The processed image frames may be displayed on the display unit 151 or may be stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in response to a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control a volume level being output from the first or second audio output modules 152a or 152b, switch to a touch recognition mode of the display unit 151, and the like. The rear input unit may be configured to permit touch input, a push input, or combinations thereof.

The rear input unit may overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The control unit 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth™ port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations or be moveable in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1C, the second audio output module 152b can be located on the terminal body. The second audio output module 152b may implement stereophonic sound functions in conjunction with the first audio output module 152a and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103 or a case that includes a conductive material.

The power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191 in order to prevent separation of the battery 191 and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, exemplary embodiments related to a control method that may be realized in the mobile terminal configured as described previously will be described with reference to the accompanying drawings. It will be obvious to a person skilled in the art that the present invention may be embodied to any other forms without departing from the spirit and scope of the present invention.

Figure 2:
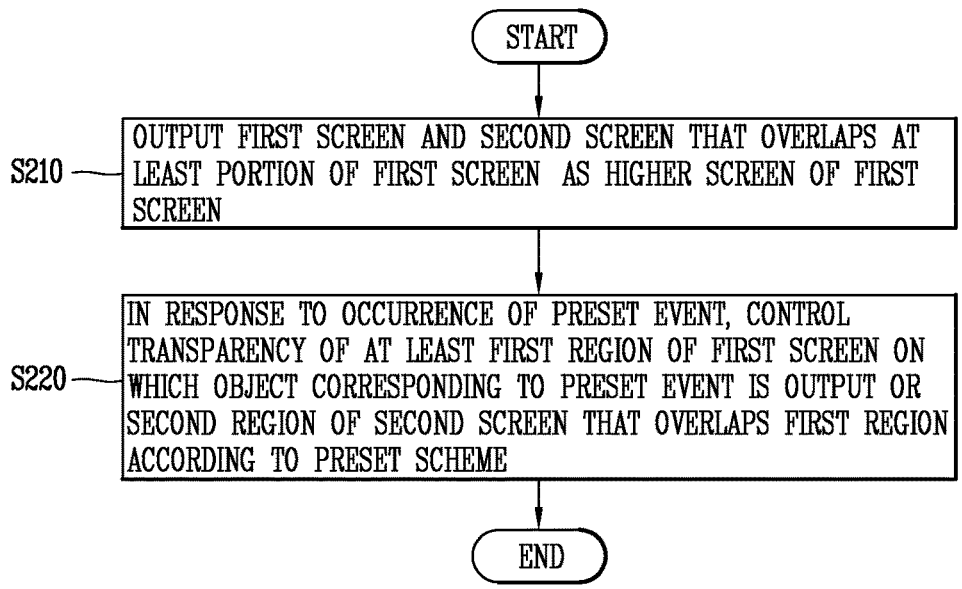
FIG. 2 is a flow chart illustrating a method for controlling a mobile terminal according to an exemplary embodiment of the present invention.

FIG. 2 is a flow chart illustrating a method for controlling a mobile terminal according to an exemplary embodiment of the present invention.

Referring to FIG. 2, a first screen and a second screen that overlaps at least one region of the first screen as a higher screen are output in step S210.

The first screen and the second screen may be defined as layers (screen windows) output on the display unit 151 and independently displaying screen information. For example, the execution screen (screen information) of a first application may be output on the first screen and the execution screen (screen information) of the second application may be output on the second screen.

Sizes and positions of the first screen and the second screen may be set by the user. For example, the user may set the size and position of the first screen such that the first screen is output to the entire region or a partial region of the display unit 151.

In another exemplary embodiment, in a state in which the first screen and the second screen are output such that the first screen and the second screen do not overlap, the user may apply a drag input to the second screen such that a partial region of the second screen overlaps the first region. In this case, screen information which has been output on the second screen as a higher screen may be preferentially displayed in the partial overlap region.

In this manner, the higher screen may be defined as a screen in which screen information which has been output is preferentially displayed when a plurality of screens overlap each other entirely or partially. Such a higher screen may be determined according to a preset scheme. For example, a screen to which a user input has been most recently applied or a screen which has been most recently output, and the like, may be set as a higher screen.

In response to occurrence of a preset event, transparency of at least one of the first region of the first screen on which an object corresponding to the preset event is being output or the second region of the second screen overlapping the first region is controlled according to a preset scheme in step S220.

An example of the preset event may be message reception, call signal reception, an absent call, an alarm, schedule notification, e-mail reception, information reception through an application, and the like. Also, the example of the preset event may include a pre-set touch input applied by the user, execution of a preset application, and the like.

An object corresponding to a preset event may be defined as an object related to a generated event. For example, when an event of message reception occurs, an object related to the generated event (an object corresponding to the event of message reception) may be defined as a received message.

The first region of the first screen refers to a portion of the first screen in which the object corresponding to the preset event has been output. The second region of the second screen refers to a portion of the second screen overlapping the first region to cover the first region.

Since the second screen is a higher screen than the first screen, the user may not check (or view) the object corresponding to the preset event. That is, the object corresponding to the preset event is covered by the second region of the second screen.

In order to solve the problem, the control unit 180 controls transparency of at least one of the first region or the second region according to a preset scheme. As a result, the user may be able to check the object corresponding to the preset event. That is, transparency of only a portion of the screen may be changed.

In an exemplary embodiment, transparency of each of the first region and the second region may be adjusted to be within a preset range. Thus, when transparency is adjusted to be within the preset range, the object output on a lower screen (the first screen) may be clearly displayed as if it was output on the higher screen (the second screen).

In another exemplary embodiment, transparency of a screen portion may be adjusted on the basis of the entire transparency of each of the current screens. In detail, only transparency of the second region may be increased to be within a preset range so as to be set transparently or only transparency of the first region may be reduced to be within a preset range such that the object corresponding to the event is clearly displayed. Alternatively, transparency of the first region may be reduced and transparency of the second region may be increased such that the object corresponding to the event can be clearly displayed.

Hereinafter, exemplary embodiments related to the step S220 will be described briefly.

In an exemplary embodiment, step S220 may include step of controlling transparency of at least the first region of the first screen on which a new object is output or transparency of the second region of the second screen overlapping the first region according to a preset scheme on the basis of an occurrence of an event in which the new object is output on the first screen.

In another exemplary embodiment, step 220 may include a step of controlling transparency of at least the first region of the first screen on which a new object is output according to a user input or transparency of the second region of the second screen overlapping the first region according to a preset scheme on the basis of occurrence of an event of a user input for outputting the new object on the first screen.

In another exemplary embodiment, step 220 may include a step of controlling transparency of at least a (1-1)th region of the first screen on which an object related to a new object is output according to the user input or transparency of a (2-1)th region of the second screen overlapping the (1-1)th region according to a preset scheme.

In another exemplary embodiment, step 220 may include a step of controlling transparency of at least the first region of the first screen on which an object selected according to the user input is output or transparency of the second region of the second screen according to a preset scheme on the basis of occurrence of an event of a user for selecting an object output on the first screen.

In another exemplary embodiment, step 220 may include a step of outputting the selected object on the first screen and controlling transparency of at least the first region of the first screen on which the selected object is output or transparency of the second region of the second screen overlapping the first region according to a preset scheme on the basis of occurrence of an event of a user input for selecting an object output on the second screen.

In another exemplary embodiment, step 220 may include a step of controlling transparency of at least the first region of the first screen on which a related object is output or transparency of the second region of the second screen overlapping the first region according to a preset scheme on the basis of occurrence of an event in which an object related to the object output on the second screen is detected from the first screen.

The exemplary embodiments will be described in detail with reference to the accompanying drawings.

As described previously, on the basis of occurrence of an event in which a new object is output on the first screen, the control unit 180 may control transparency of at least the first region of the first screen on which the new object is output or transparency of the second region of the second screen overlapping the first region according to a preset scheme.

In an exemplary embodiment, on the basis of occurrence of a message reception event, the control unit 180 may control transparency of at least the first region of the first screen on which a received message is output or transparency of the second region of the second screen overlapping the first region according to a preset scheme.

Figure 3:
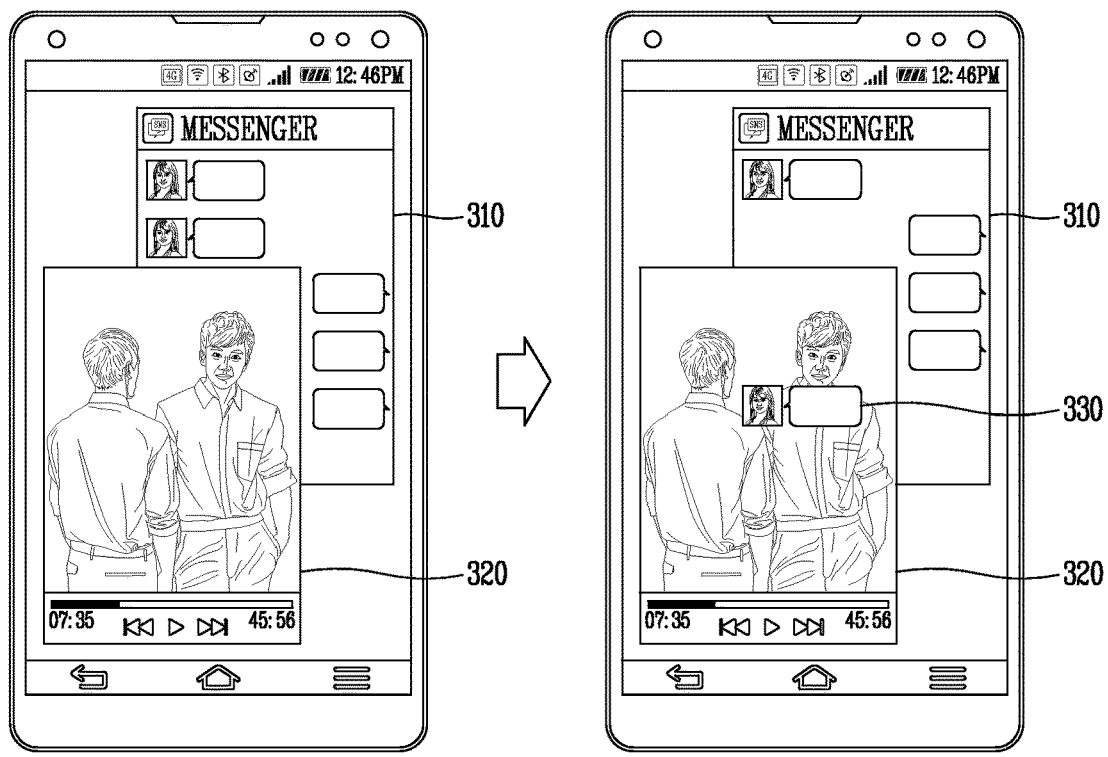
FIG. 3 is a conceptual view illustrating an exemplary embodiment in which transparency is adjusted according to output of a new object.

FIG. 3 is a conceptual view illustrating an exemplary embodiment in which transparency is adjusted according to output of a new object.

Referring to FIG. 3, a first screen 310 and a second screen 320 as a higher screen of the first screen 310 may be output. In detail, a partial region of the first screen 310 may be covered by the second screen 320, and an execution screen of a messenger application may be output on the first screen 310 and a play screen of video may be output on the second screen 320.

An event of message reception may occur in the terminal 100 and a received message 330 may be output on a partial region (first region) of the first screen 310. Accordingly, the control unit 180 may control transparency of at least one first region of the first screen on which the received message 330 is output or transparency of the second region of the second screen 320 covering the first region according to a preset scheme. For example, transparency of the second region may be increased to be within a preset range. As a result, the received message 330 may be displayed on the play screen of video.

In another exemplary embodiment, the control unit 180 may control transparency of at least the first region of the first screen on which a conversation counterpart who has sent the message is displayed together with the received message 330 or transparency of the second region of the second screen covering the region of the first screen according to a preset scheme. For example, transparency of the second region may be increased to be within a preset range. As a result, the conversation counterpart which has sent the message may be displayed on the play screen of the video together with the received message 330.

Meanwhile, as described previously, on the basis of occurrence of an event of a user input for outputting a new object on the first screen, the control unit 180 may control transparency of at least the first region of the first screen on which the new object is output according to a user input or transparency of the second region of the second screen overlapping the first region according to a preset scheme.

Also, the control unit 180 may control transparency of at least a (1-1)th region of the first region on which an object related to the new object is output according to a user input or transparency of a (2-1)th region of the second screen overlapping the (1-1)th region according to a preset scheme.

In a specific exemplary embodiment, on the basis of occurrence of an event of a user input for creating a message in the first screen, the control unit 180 may control transparency of at least the first region of the first screen on which a message is output according to the user input or transparency of the second region of the second screen overlapping the first region according to a preset scheme.

Also, the control unit 180 may control transparency of at least a (1-1)th region of the first screen on which a message which has been sent and received before the message is output or transparency of a (2-1) region of the second screen overlapping the (1-1) region according to a preset scheme.

FIGS. 4A, 4B, 4C, 4D, and 4E are conceptual views illustrating an exemplary embodiment in which transparency is adjusted by a user input for outputting a new object.

Figure 4A:
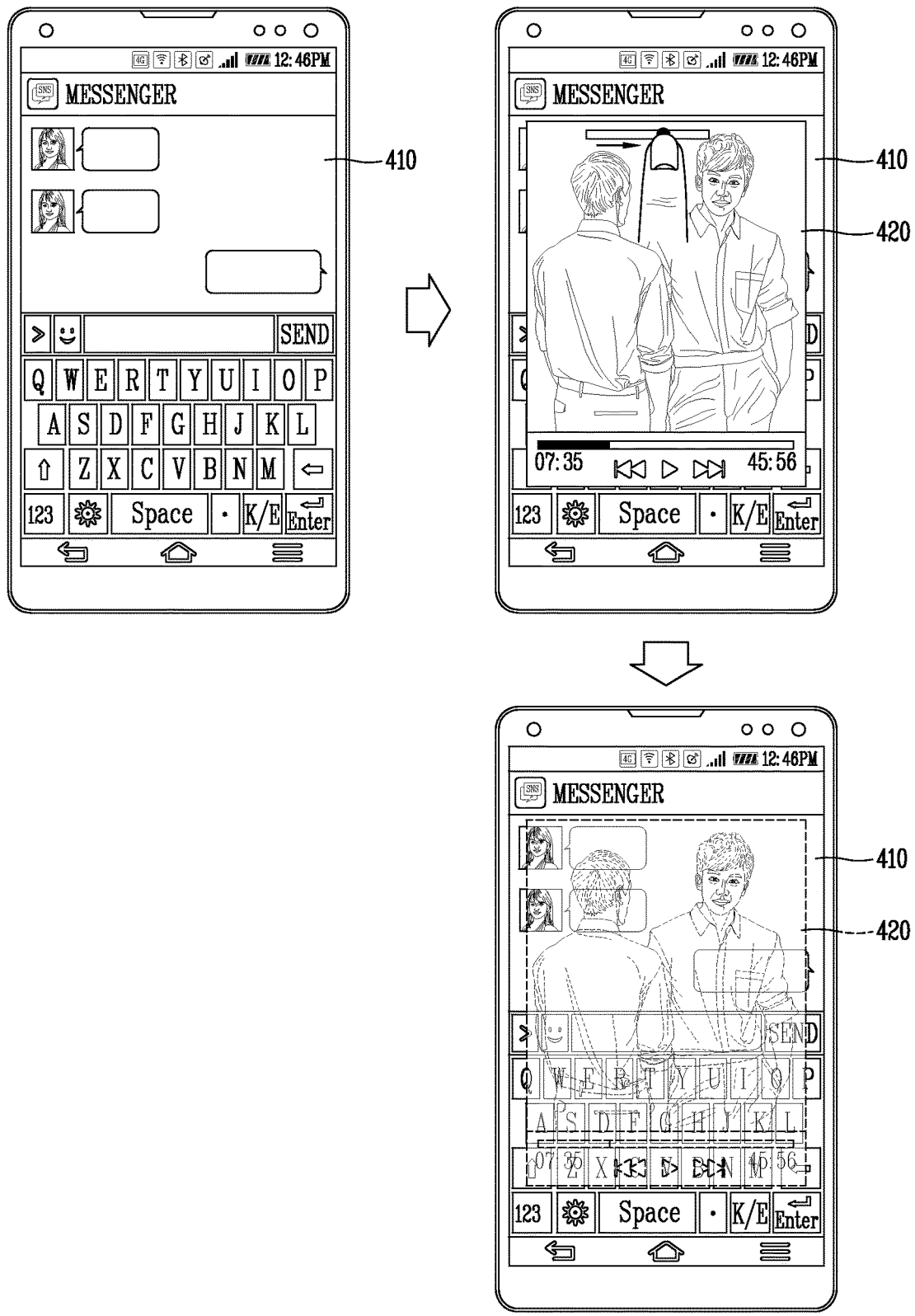
FIGS. 4A, 4B, 4C, 4D, and 4E are conceptual views illustrating an exemplary embodiment in which transparency is adjusted by a user input for outputting a new object.

Referring to FIG. 4A, a first screen 410 including an execution screen of a messenger application (i.e., on which an execution screen of the application is output) may output on the entire region of the display unit 151.

In this state, when a video application is executed, a second screen 420 outputting a video play screen may be output as a higher screen of the first screen 410. For example, the user may apply a drag input moving downward from a status bar of the terminal 100 to spread the status bar. Subsequently, the user may apply a touch input to an icon corresponding to the video application output in the spread status bar to execute the video application. Thus, the first screen 410 is covered by the second screen 420 on which the execution screen of the video application is output.

In this case, the user may adjust transparency of the second screen 420 such that the execution screen of the messenger application output on the first screen 410 may be visible. For example, by increasing transparency of the second screen 420, contents of the exchanged messages may be read, while viewing video.

Figure 4B:
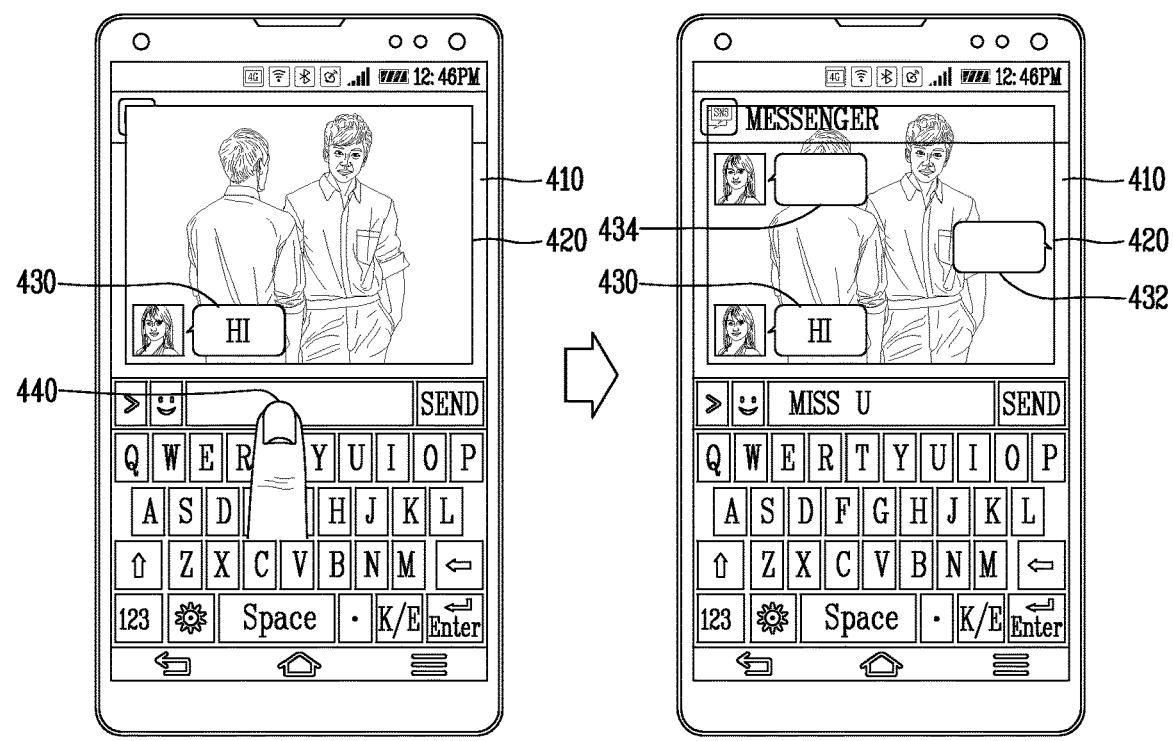

In another exemplary embodiment, referring to FIG. 4B, the first screen 410 including (outputting) an execution screen of a messenger application may be output on the entirety of the display unit 151. Also, the second screen 420 including the video play screen may be output as a higher screen of the first screen 410. That is, the first screen 410 is covered by the second screen 420 on which the execution screen of the video application is being output.

In this state, as illustrated in FIG. 3, an event of message reception may occur. Thus, transparency of at least the first region of the first screen 410 on which a newly received message 430 is output or transparency of the second region of the second screen 420 covering the first region may be adjusted according to a preset scheme. As a result, the received image 430 may be displayed on the video play screen.

In an exemplary embodiment, transparency of the second region of the second screen 420 covering the first region of the first screen 410 on which the newly received message is output may be increased.

Subsequently, the user may apply a touch input 440 to a keypad in order to create a new message. Accordingly, the previously exchanged messages 430, 432, and 434 may be displayed on the video play screen.

In an exemplary embodiment, while the user is inputting a new message in a message window, transparency of the second screen 420 portion covering the portion of the first screen 410 on which the previously exchanged messages 430, 432, and 434 are output may be increased.

That is, the new message input by the user corresponds to a new object output according to the user input and the previously exchanged messages correspond to objects related to the new object.

Figure 4C:
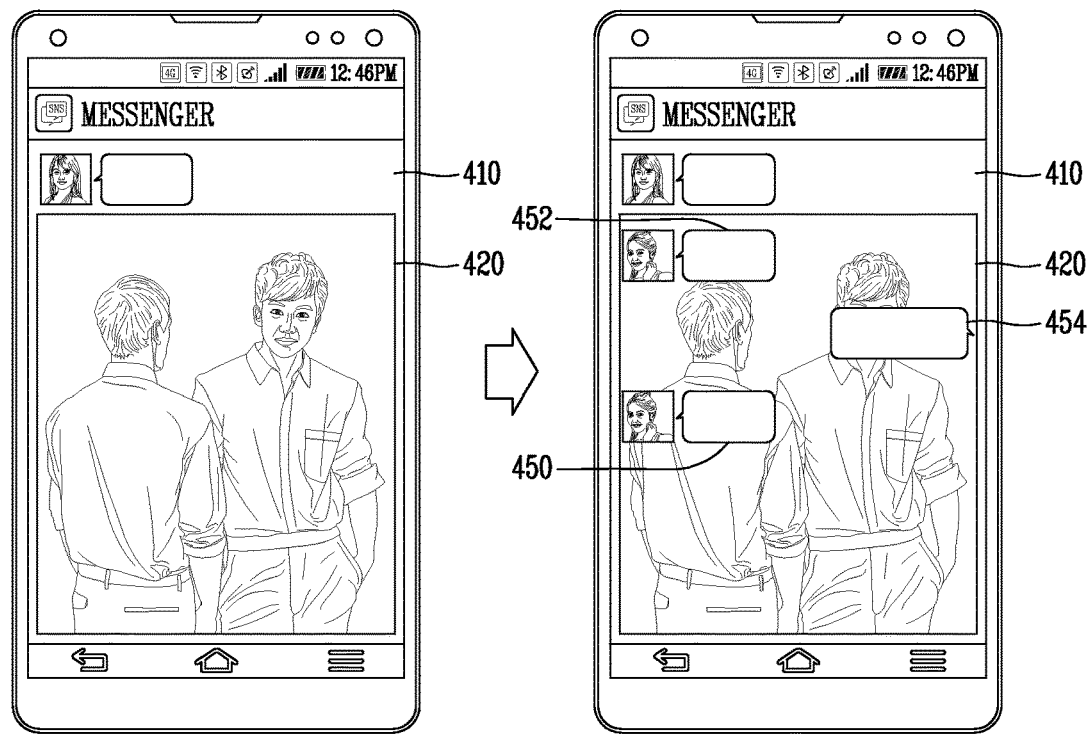

In another exemplary embodiment, referring to FIG. 4C, the first screen 410 including (outputting) the execution screen of the messenger application may be output on the entirety of the display unit 151. Also, the second screen 420 including the video play screen may be output as a higher screen of the first screen 410. That is, the first screen 410 may be covered by the second screen 420 outputting the video play screen.

In this state, an event of message reception may occur. Accordingly, transparency of at least the first region of the first screen 410 on which the newly received message 450 is output or transparency of the second region of the second screen 420 covering the first region may be adjusted according to a preset scheme. For example, transparency of the second region of the second screen 420 covering the first region of the first screen 410 on which the newly received message 450 is output may be increased.

Also, transparency of at least the first region of the first screen 410 on which a message 452 previously sent by a counterpart who has sent the newly received message 450 is output and the second region of the second screen 420 covering the first region may be adjusted according to a preset scheme. For example, transparency of the second screen 420 region covering the first screen 410 region on which the message 452 which had been previously send by the counterpart who has sent the newly received message 450 may be increased.

As a result, the messages 450 and 452 received from the counterpart may be displayed on the video play screen. Also, transparency of the message 454 created (transmitted) by the user is also adjusted according to the scheme described above and displayed together on the video play screen.

Figure 4D:
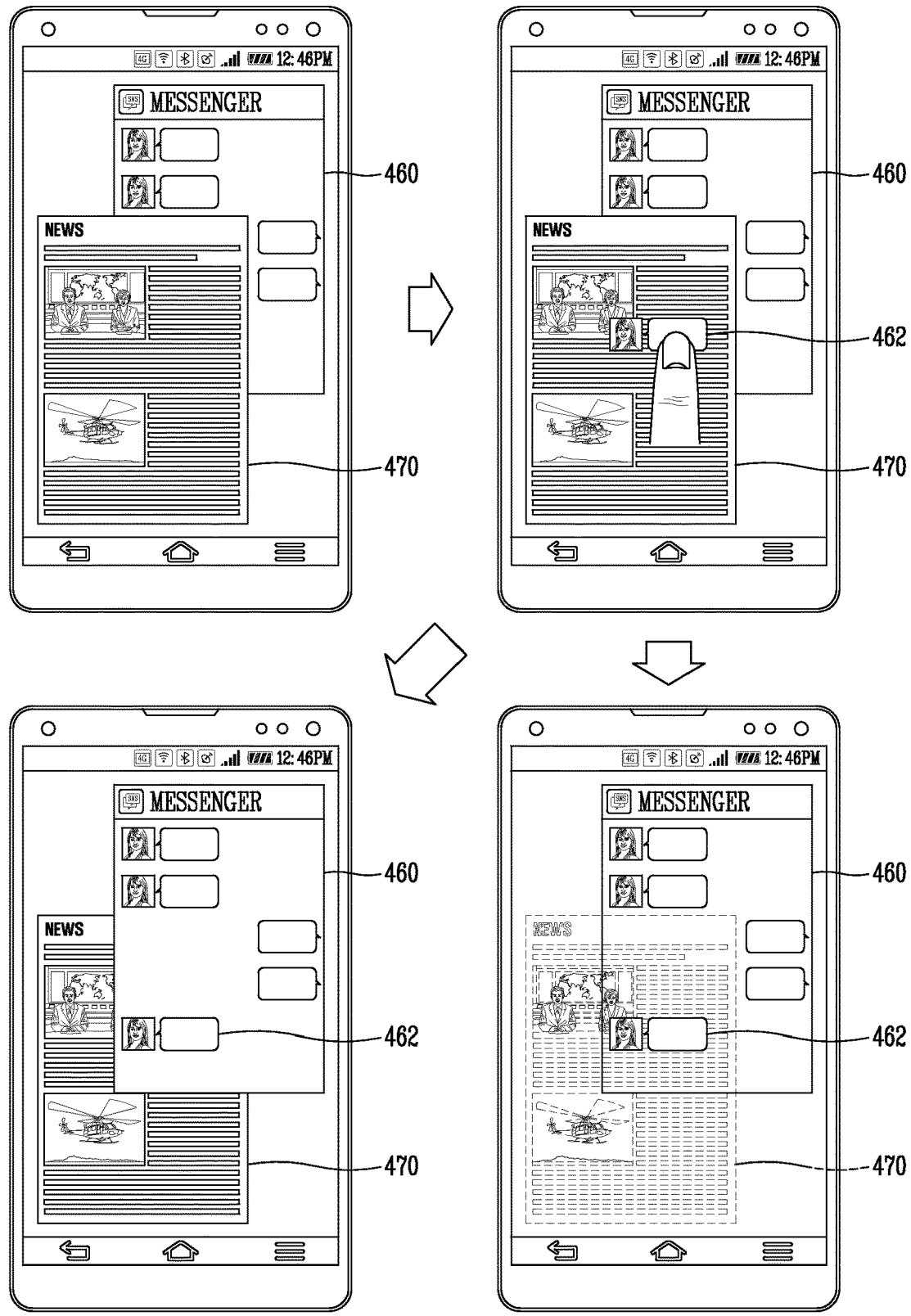

In another exemplary embodiment, referring to FIG. 4D, a first screen 460 including an execution screen of the messenger application and a second screen 470 including a Web browser screen as a higher screen of the first screen 460 may be output.

In this case, when a new message 462 is received, transparency of one region (second region) of the second screen 470 covering the new message 462 is increased. As a result, the new message 462 may be displayed on the Web browser screen.

Subsequently, the user may apply a touch input to the new message 462 displayed on the Web browser screen. Accordingly, transparency of the entirety of at least the first screen 460 and the second screen 470 may be adjusted. For example, referring to the lower drawing on the right side of FIG. 4D, transparency of the entirety of the second screen 470 is increased. As a result, the portion of the execution screen of the application covered by the Web browser may be checked for a preset period of time.

In another exemplary embodiment, when the user applies a touch input to the new message 462 displayed on the Web browser screen, the upper and lower relationship in which each of the screens 460 and 470 are preferentially output may be changed. In detail, referring to the lower drawing on the left side of FIG. 4D, the first screen 460 may be set as a higher screen than the second screen 470.

Figure 4E:
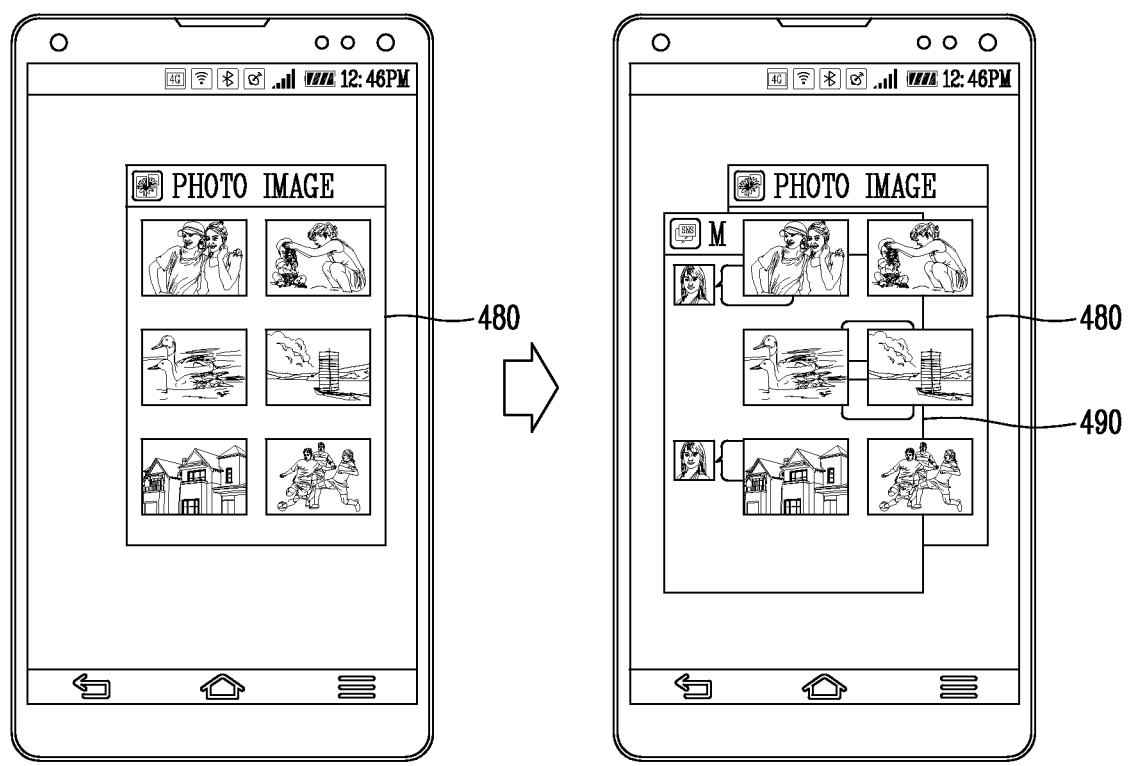

In another exemplary embodiment, referring to FIG. 4E, while a photo album application is being executed in a first screen 480, the messenger application may be executed and output on a second screen 490.

In an exemplary embodiment, the later output second screen 490 may be set as a higher screen than the first screen 480. In this case, transparency of the second region of the second screen 490 overlapping the first region in which photo images of the first screen 480 are output is increased, and thus, the photo images output on the first screen 480 may be continuously displayed without being covered.

Meanwhile, on the basis of an occurrence of an event of a user input for selecting an object output on the first screen, the control unit 180 may control transparency of at least the first region of the first screen on which the object selected according to the user input is output or transparency of the second region of the second screen overlapping the first region according to a preset scheme.

Figure 5A:
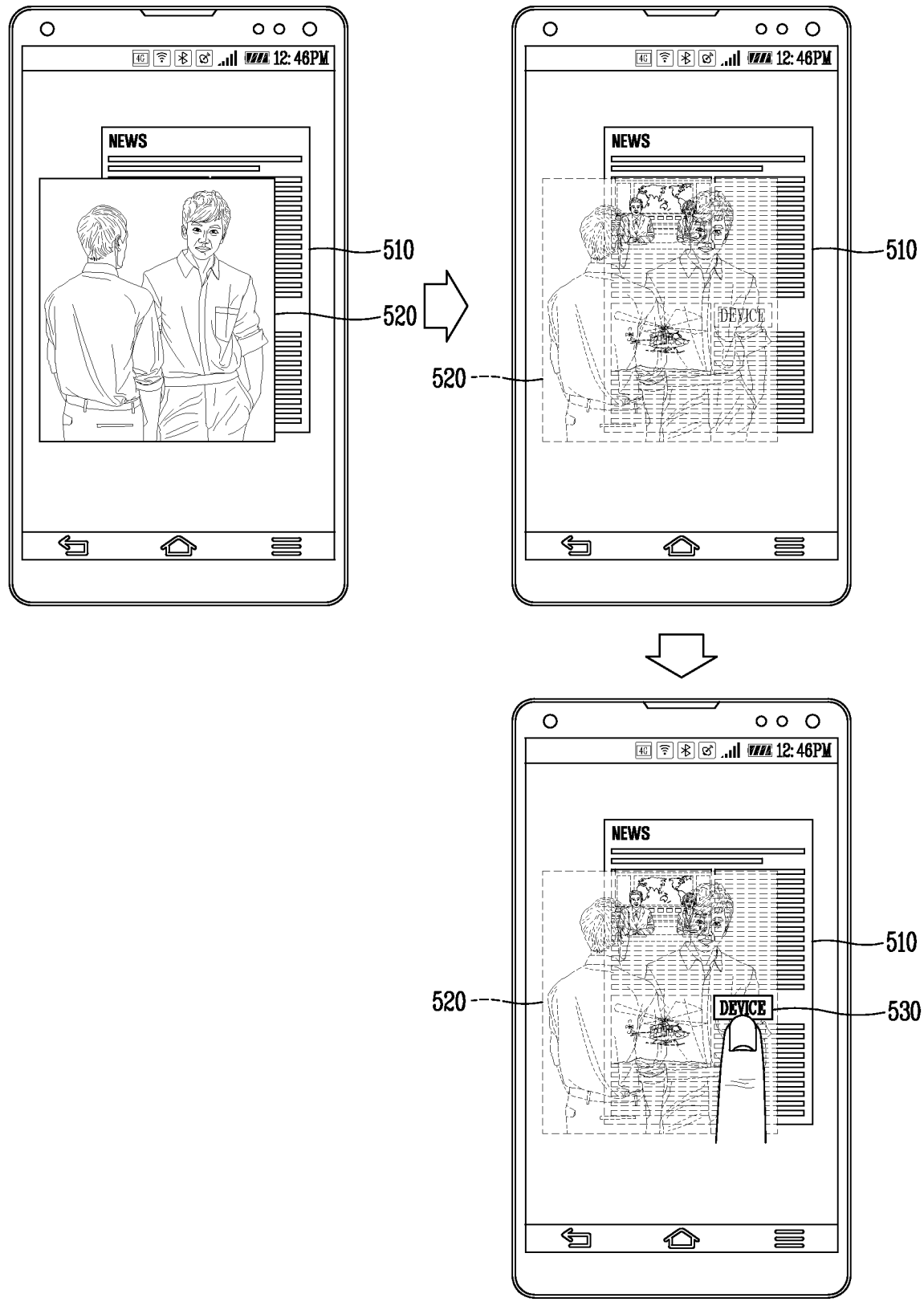
FIGS. 5A, 5B, and 5C are conceptual views illustrating an exemplary embodiment in which transparency is adjusted according to a user input for selecting an object.
Figure 5B:
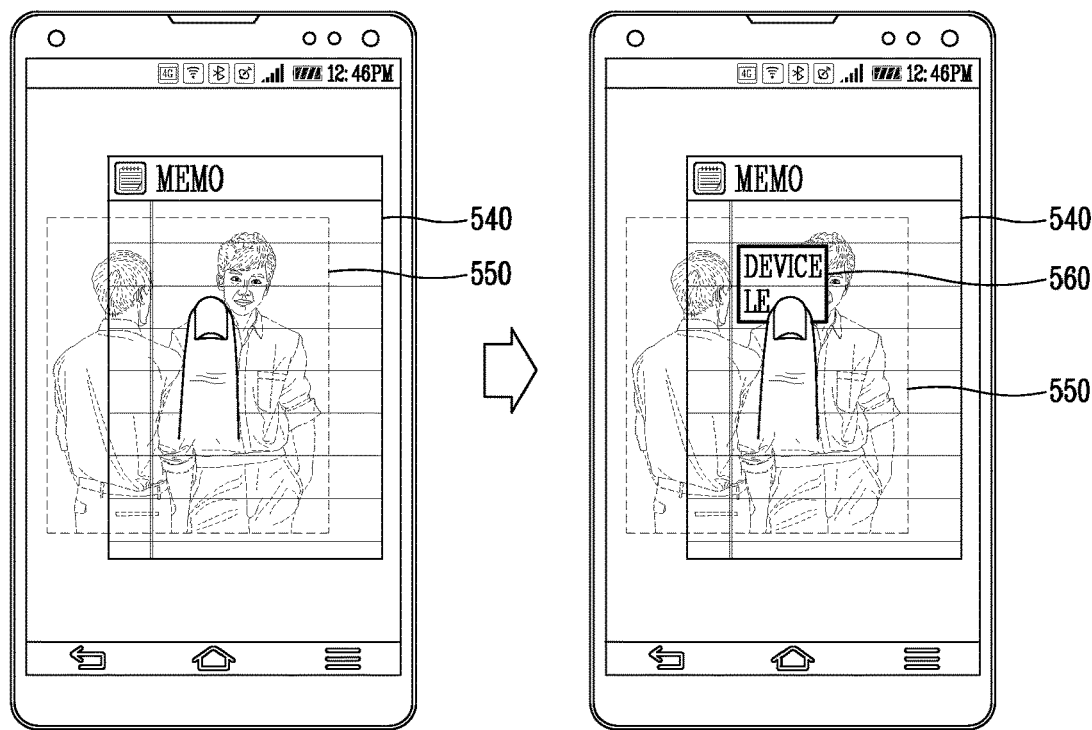
Figure 5C:
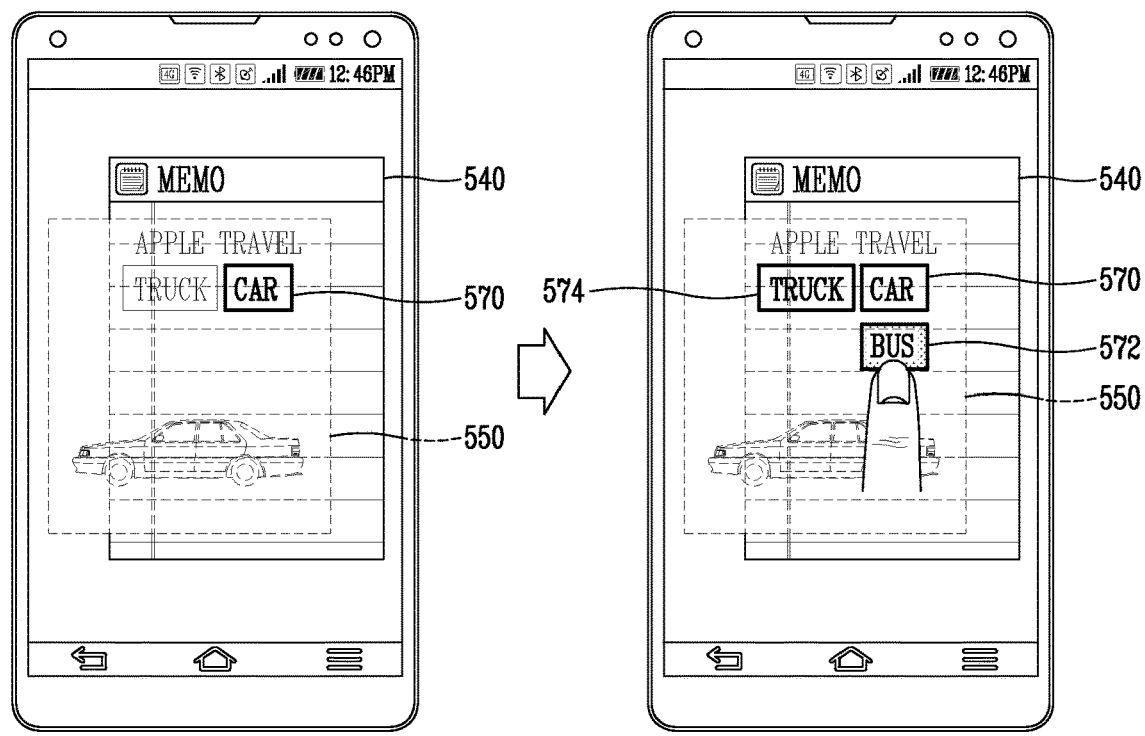

FIGS. 5A, 5B, and 5C are conceptual views illustrating an exemplary embodiment in which transparency is adjusted according to a user input for selecting an object.

Referring to FIG. 5A, a first screen 510 including an execution screen of a Web browser and a second screen 520 as a higher screen than the first screen 510 and including a video play screen may be output. In this case, a portion of the first screen 510 is covered by the second screen 520 as a higher screen.

In order to check (or read) the covered portion of the first screen 510, the user may be increased transparency of the entirety of the second screen 520. Referring to the upper drawing on the right side of FIG. 5A, the user may view the video as a dim screen and check contents of the Web browser covered by the second screen 520 simultaneously.

Subsequently, the user may apply a long touch to text 530 output on the Web browser to copy the text 530 to a clip board. Accordingly, transparency of the second screen 520 portion covering the selected text may further be increased to clearly display the text 530.

In another exemplary embodiment, in a state in which transparency of the first screen 510 and transparency the second screen 520 have been increased, a long touch input may be applied to the text 530 output on the Web browser.

Accordingly, transparency of the first screen 510 portion in which the selected text 530 is output is lowered and the text 530 may be clearly displayed. Alternatively, transparency of the first screen 510 portion in which the selected text 530 is output may be lowered and transparency of the second screen 520 portion covering the first screen 510 portion may further be increased and the text 530 may be clearly displayed. That is, transparency of screen portions may be adjusted on the basis of the transparency of the entirety of each of the current screens.

In another exemplary embodiment, referring to FIG. 5B, a first screen 540 including an execution screen of a memo application (a memo pad) and a second screen 550 as a higher screen than the first screen 540 and including a video play screen may be output. In this case, a portion of the first screen 540 is covered by the second screen 550 and the user may increase transparency of the entirety of the second screen 550 in order to check (or read) the covered contents.

Subsequently, the user may apply an input such as text paste, text input, image paste, and the like, to the memo pad. Accordingly, transparency of the second screen 550 portion covering an object 560 such as output text or an image may be increased and the object 560 may be clearly displayed.

In another exemplary embodiment, in a state in which transparency of the first screen 540 and transparency of the second screen 550 have been increased, the text 560 may be pasted or input to the memo pad.

Accordingly, transparency of the first screen 540 portion in which the text 560 is output is lowered and the text 560 may be clearly displayed. Alternatively, transparency of the first screen 540 portion in which the text 560 is output may be lowered and transparency of the second screen 550 portion covering the first screen 540 portion may further be increased and the text 560 may be clearly displayed. That is, transparency of the screen portions may be adjusted on the basis of the transparency of the entirety of each of the current screens.

In another exemplary embodiment, when the user completes memo input and terminates the memo application, only the second screen 550 is output. In this case, transparency of the second screen 550 may be adjusted to be within the preset range. As a result, the video may be clearly displayed.

In another exemplary embodiment, referring to FIG. 5C, a first screen 540 including an execution screen of the memo application (memo pad) and a second screen 550 as a higher screen than the first screen 540 and including a video play screen may be output. In this case, since a portion of the first screen 540 is covered by the second screen 550 as a higher screen, the user may increase transparency of the entirety of the second screen 550 in order to check (read) covered contents.

Also, since the transparency of the second screen 550 portion covering the most recently output object 570 is increased, the object 570 may be clearly displayed. In this case, the object 570 may include text, an image, and the like, which has been most recently input or pasted.

Also, in another exemplary embodiment, in a case in which transparency of the first screen 540 and transparency of the second screen 550 have been increased, transparency of the first screen 540 portion in which the text 560 is output is lowered and the object 570 may be clearly displayed. Alternatively, transparency of the first screen 540 portion in which the object 570 is output may be lowered and transparency of the second screen 550 portion covering the first screen 540 portion may further be increased and the object 570 may be clearly displayed. That is, transparency of the screen portions may be adjusted on the basis of the transparency of the entirety of each of the current screens.

Related objects 570 and 574 may be the same as the input object 572 or related to the input object 572 and may be objects which have been previously set. For example, in a case in which the user inputs "BUS" 572, "TRUCK" 574 and "CAR" 570 corresponding to a vehicle from among "APPLE", "TRAVEL", "TRUCK" and "CAR" as output text, the input text may be clearly displayed.

Alternatively, the related objects 570 and 574 may be objects which have been input for a preset period of time. For example, before the user inputs "BUS" 572, "TRUCK" 574 and "CAR" 570 which have been input for the past a few minutes may be clearly displayed.

Also, in another exemplary embodiment, when the user completes memo input and terminates the memo application, only the second screen 550 is output. In this case, transparency of the second screen 550 may be adjusted to be within the preset range. As a result, the video may be clearly displayed.

Meanwhile, on the basis of an occurrence of an event of a user input for selecting an object output on the second screen, the control unit 180 may output the selected object on the first screen and control transparency of at least the first region of the first screen on which the selected object is output or the transparency of the second region of the second screen overlapping the first region according to a preset scheme.

Figure 6A:
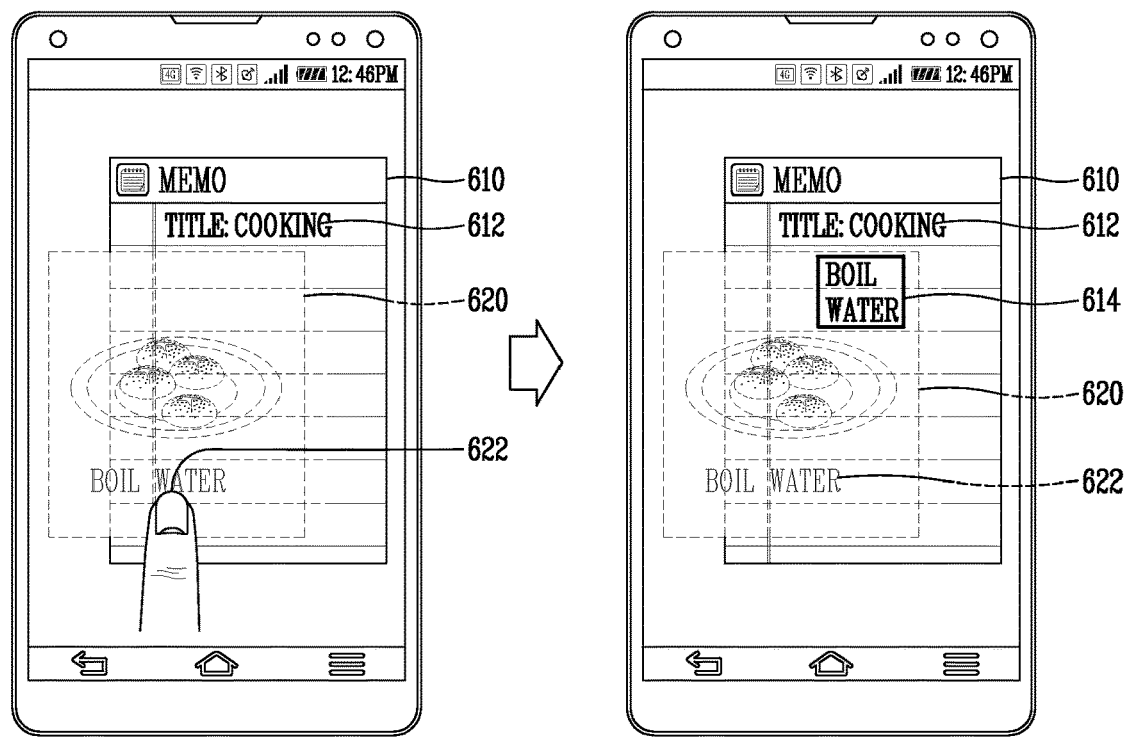
FIGS. 6A, 6B, and 6C are conceptual views illustrating an exemplary embodiment in which transparency is adjusted according to a user input for selecting an object output on a higher screen.
Figure 6B:
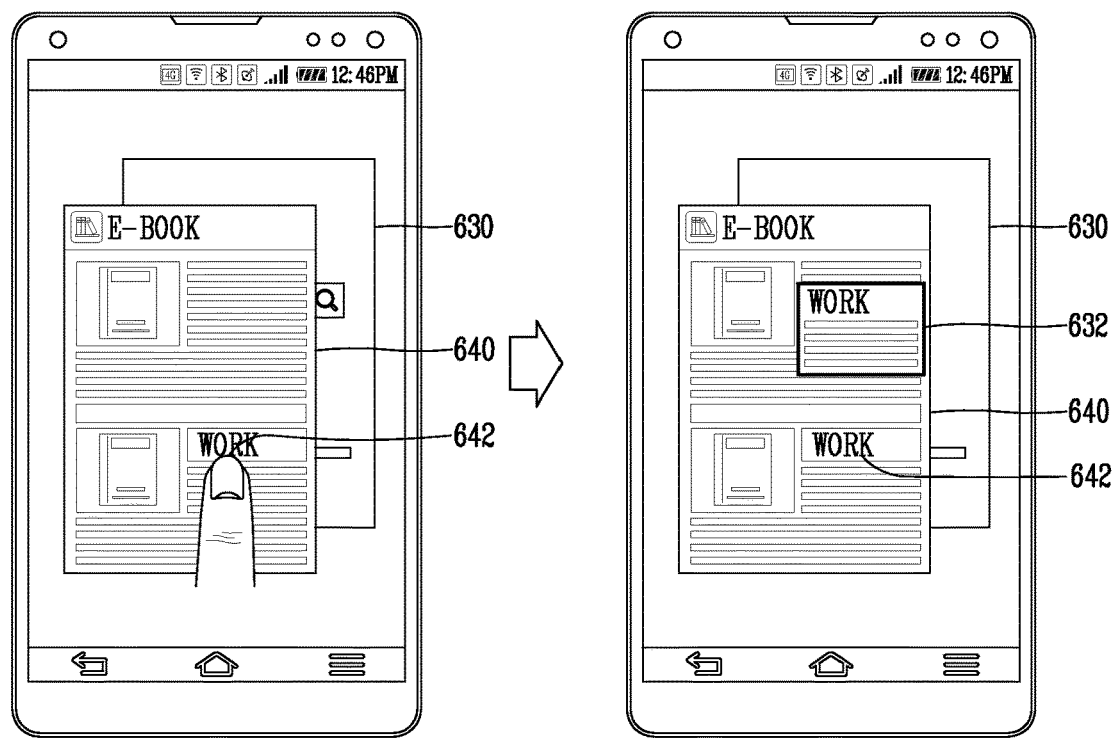
Figure 6C:
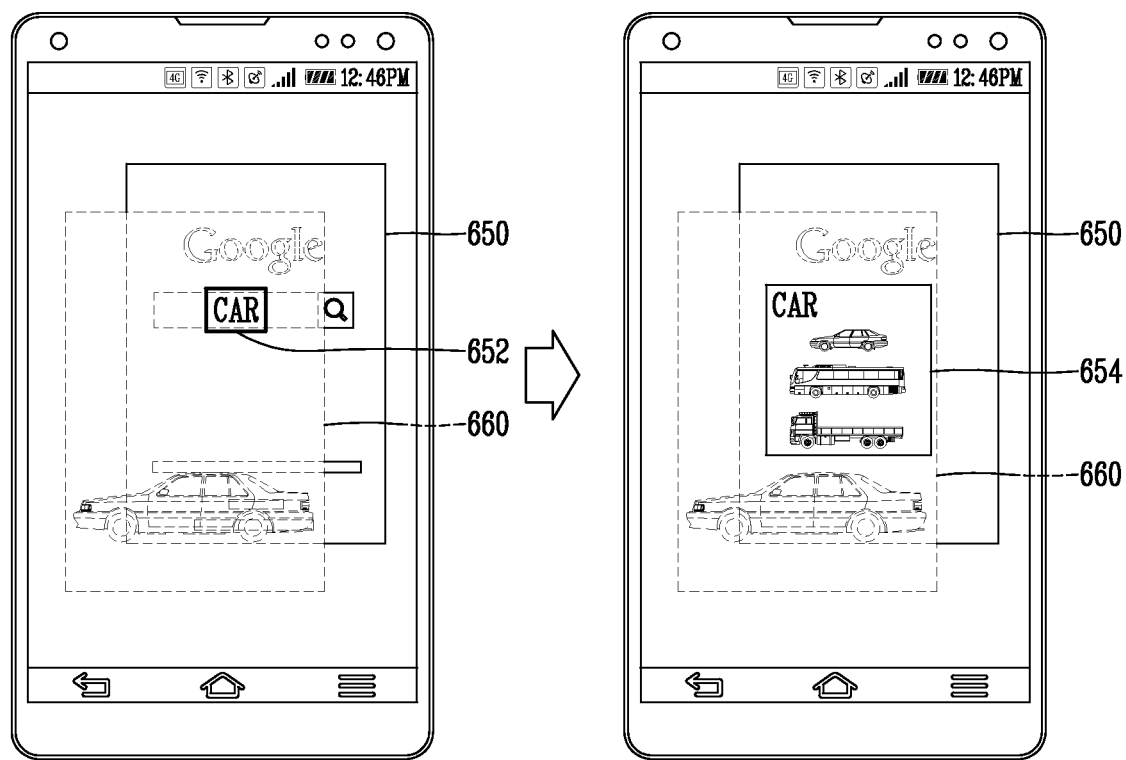

FIGS. 6A, 6B, and 6C are conceptual views illustrating an exemplary embodiment in which transparency is adjusted according to a user input for selecting an object output on a higher screen.

Referring to FIG. 6A, a first screen 610 including an execution screen of the memo application and a second screen 620 including a video play screen as a higher screen than the first screen 610 may be output.

In an exemplary embodiment, the user may execute a video on the second screen 620 and subsequently apply a touch input to an icon corresponding to the memo application. Thus, the memo application is executed and partial information 612 related to the executed video may be output on the execution screen of the memo application. In detail, a title 612, a summary, and the like, of the executed video may be output on the executed screen of the memo application.

Also, in another exemplary embodiment, the user may increase transparency of the entirety of the second screen 620. As a result, the video may be viewed dimly, while the portion of the first screen 610 covered by the second screen 620 may be checked (or read).

Subsequently, the user may apply a preset type of touch input to an object included in the video play screen. For example, the user may apply a double touch input to text 622 output on the video play screen.

Due to the double touch input, text 614 may be output to the execution screen of the memo application included in the first screen 610. Also, transparency of the second region of the second screen 620 covering the first region of the first screen 610 on which the text 614 is output may be increased, and thus, the text 614 may be clearly displayed.

Also, In another exemplary embodiment when transparency of the first screen 610 and transparency the second screen 620 have been increased, transparency of the first region on which the text 614 is output and the text 614 may be clearly displayed.

Alternatively, transparency of the first region in which the text 614 is output is lowered and transparency of the second region covering the first region may be increased and the text 614 may be clearly displayed. That is, on the basis of the transparency of the entirety of each of the current screens, transparency of screen portions may be adjusted.

Also, in another exemplary embodiment, referring to FIG. 6B, a first screen 630 including an execution screen of a Web browser and a second screen 640 including an e-book execution screen as a higher screen than the first screen may be output.

Subsequently, the user may apply a preset type of touch to an object included in the e-book execution screen. For example, the user may apply a long touch input to text 642 output on the e-boot execution screen.

Due to the long touch input, a meaning of the text 642 is searched from the Web browser of a first screen 630, and transparency of a second region of a second screen 640 covering the first region of the first screen 630 on which the result 632 of the word search is output is further increased and the result 632 of the word search may be clearly displayed.

Also, in another exemplary embodiment when transparency of the first screen 610 and transparency the second screen 620 have been increased, transparency of the first region on which the result 632 of word search is output is lowered and the result 632 of word search may be clearly displayed.

Alternatively, transparency of the first region on which the result 632 of word search is output is lowered and transparency of the second region covering the first region may be further increased and the result 632 of word search may be clearly, displayed. That is, on the basis of the transparency of the entirety of each of the current screens, transparency of screen portions may be adjusted.

Also, in another exemplary embodiment, referring to FIG. 6C, a first screen 650 including a Web browser screen and a second screen 660 including a video play screen as a higher screen than the first screen 650 may be output. In this case, the user may increase transparency of the entirety of the second screen 660 in order to view the video as a dim screen and check (or read) the contents of the Web browser screen.

Subsequently, when the user inputs a search word 642 into a search window of the Web browser screen, transparency of a second region of the second screen 660 overlapping the first region of the first screen 650 is further increased and the search word 652 is clearly displayed.

Similarly, since transparency of the second screen 660 portion overlapping the first screen 650 portion on which the result 654 of search from the Web browser is output is further increased, the search result 654 may be clearly displayed.

Also, in another exemplary embodiment when transparency of the first screen 650 and transparency the second screen 660 have been increased, transparency of the first region in which the search word 652 and the search result 654 are output is lowered and the search word 652 and the search result 654 may be clearly displayed.

Alternatively, transparency of the first region may be lowered and transparency of the second region covering the first region may be increased and the search word 652 and the search result 654 may be clearly displayed. That is, on the basis of the transparency of the entirety of each of the current screens, transparency of screen portions may be adjusted.

Meanwhile, based on occurrence of an event in which a touch input previously set for controlling the first screen is applied to a region in which the first screen and the second screen overlap each other, the control unit 180 may control transparency of at least a first region of the first screen on which a new object is output in response to the preset touch input or a second region of the second screen overlapping the first region according to a preset scheme.

Also, based on an occurrence of an event in which a preset touch input for controlling the second screen is applied to a region in which the first screen and the second screen overlap each other, the control unit 180 may execute a control operation corresponding to the preset touch input on the second screen.

Figure 7A:
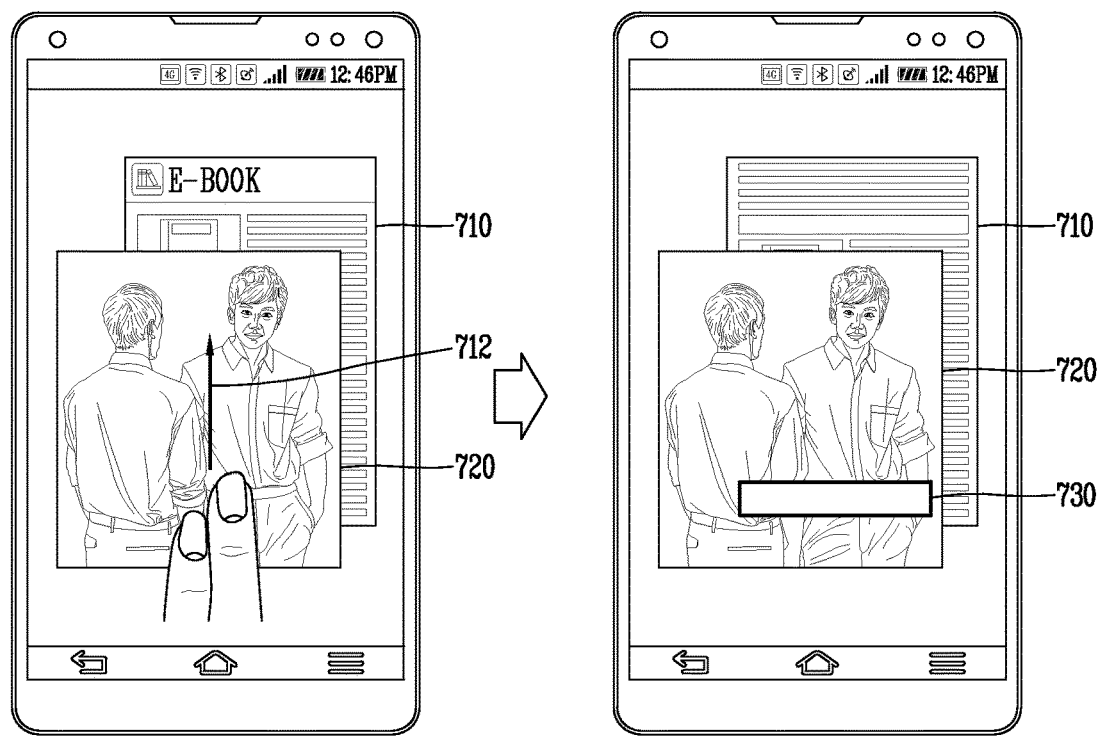
FIGS. 7A, 7B, and 7C are conceptual views illustrating an exemplary embodiment in which transparency is adjusted according to a touch input applied to an overlap region.
Figure 7B:
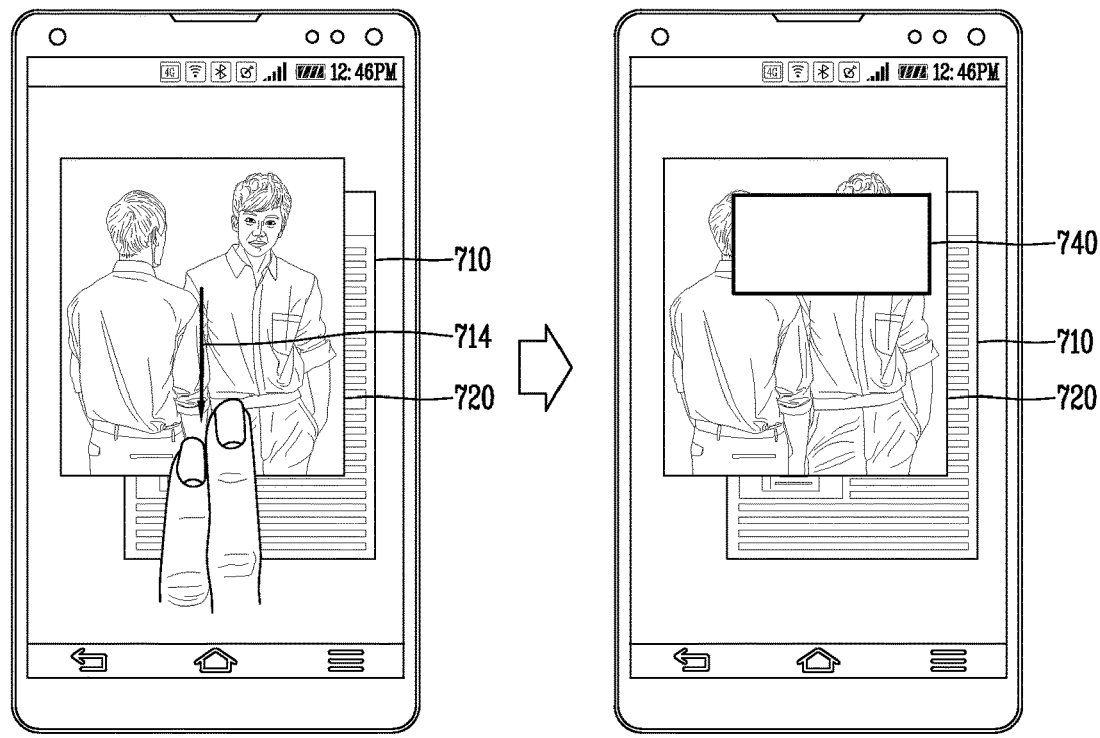
Figure 7C:
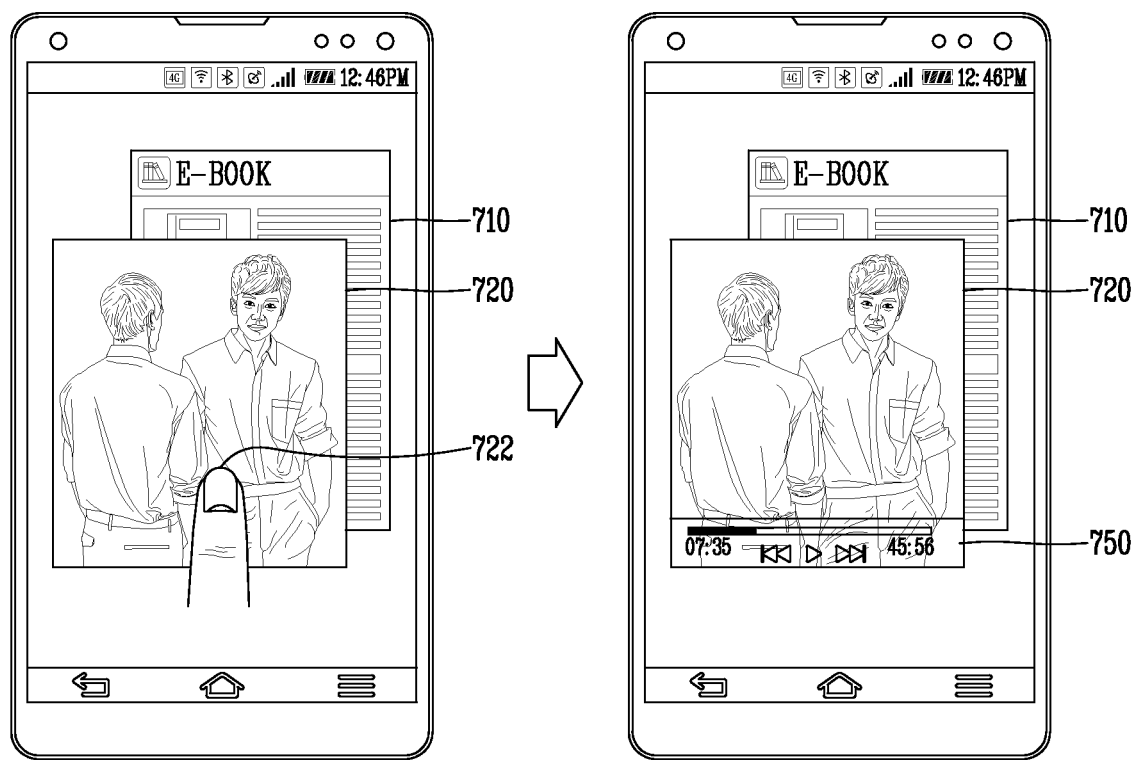

FIGS. 7A, 7B, and 7C are conceptual views illustrating an exemplary embodiment in which transparency is adjusted according to a touch input applied to an overlap region.

Referring to FIG. 7A, a first screen 710 including an e-book execution screen and a second screen 720 including a video play screen as a higher screen than the first screen 710 may be output. Subsequently, the user may apply a scroll-up input 712 with two fingers in a region in which the first screen 710 and the second screen 720 overlap each other.

Accordingly, a new paragraph 730 may be output in a lower end of the e-book execution screen included in the first screen 710. Transparency of the second region of the second screen 720 covering the first region of the first screen 710 on which the new paragraph 730 is output is increased and the new paragraph 730 may be clearly displayed.

Also, in another exemplary embodiment when transparency of the entirety of the second screen 720 has been increased, transparency of the second region of the second screen 720 covering the first region may be further increased and the new paragraph 730 may be clearly displayed.

Also, in another exemplary embodiment when transparency of the entirety of the first screen 710 and transparency the entirety of the second screen 720 have been increased, transparency of the first region may be lowered and the new paragraph 730 may be clearly displayed.

Alternatively, transparency of the first region may be lowered and transparency of the second region covering the first region may be increased and the new paragraph 730 may be clearly displayed. That is, based on the transparency of the entirety of each of the current screens, transparency of screen portions may be adjusted.

Also, in another exemplary embodiment, the new paragraph 730 may be output in a background color as a color complementary to a color of the currently played video.

Also, in another exemplary embodiment, referring to FIG. 7B, the first screen 710 including an e-book execution screen and the second screen 720 including a video play screen as a higher screen than the first screen 710 may be output. Subsequently, the user may apply a scroll-down input 714 with two fingers to a region in which the first screen 710 and the second screen 720 overlap each other.

Accordingly, a new paragraph 740 may be output in an upper end of the e-book execution screen included in the first screen 710. Transparency of the second region of the second screen 720 covering the first region of the first screen 710 on which the new paragraph 740 is output is increased and the new paragraph 740 may be clearly displayed.

Also, in another exemplary embodiment when transparency of the entirety of the second screen 720 has been increased, transparency of the second region of the second screen 720 covering the first region may be further increased and the new paragraph 740 may be clearly displayed.

Also, in another exemplary embodiment when transparency of the entirety of the first screen 710 and transparency the entirety of the second screen 720 have been increased, transparency of the first region may be lowered and the new paragraph 740 may be clearly displayed.

Alternatively, transparency of the first region may be lowered and transparency of the second region covering the first region may be increased and the new paragraph 740 may be clearly displayed. That is, based on the transparency of the entirety of each of the current screens, transparency of screen portions may be adjusted.

Also, in another exemplary embodiment, the new paragraph 740 may be output in a background color as a color complementary to a color of the currently played video.

Also, in another exemplary embodiment when the image output on the first screen is covered by the second screen 720 as a higher screen according to user's scroll inputs 712 and 714, transparency of the second screen 720 portion covering the overlap portion of the image is increased and the covered portion of the image can be clearly displayed.

Also, in another exemplary embodiment, referring to FIG. 7C, the first screen 710 including an e-book execution screen and the second screen 720 including a video play screen as a higher screen than the first screen 710 may be output. Subsequently, when the user applies a long touch input 722 with one finger to a region in which the first screen 710 and the second screen 720 overlap each other, a control bar 750 for controlling the video may be output on the second screen 720.

Referring to FIGS. 7A through 7C, the first screen 710 or the second screen 720 may be controlled according to a preset touch input applied to the region in which the first screen 710 and the second screen 720 overlap each other.

Meanwhile, based on occurrence of an event in which an object related to an object output on the second screen is detected from the first screen, the control unit 180 may control transparency of at least the first region of the first screen on which the related object is output or the second region of the second screen overlapping the first region according to a preset scheme.

Also, based on a preset touch input applied to the related object, the control unit 180 may control transparency of at least the first screen or the second screen according to a preset scheme.

Figure 8A:
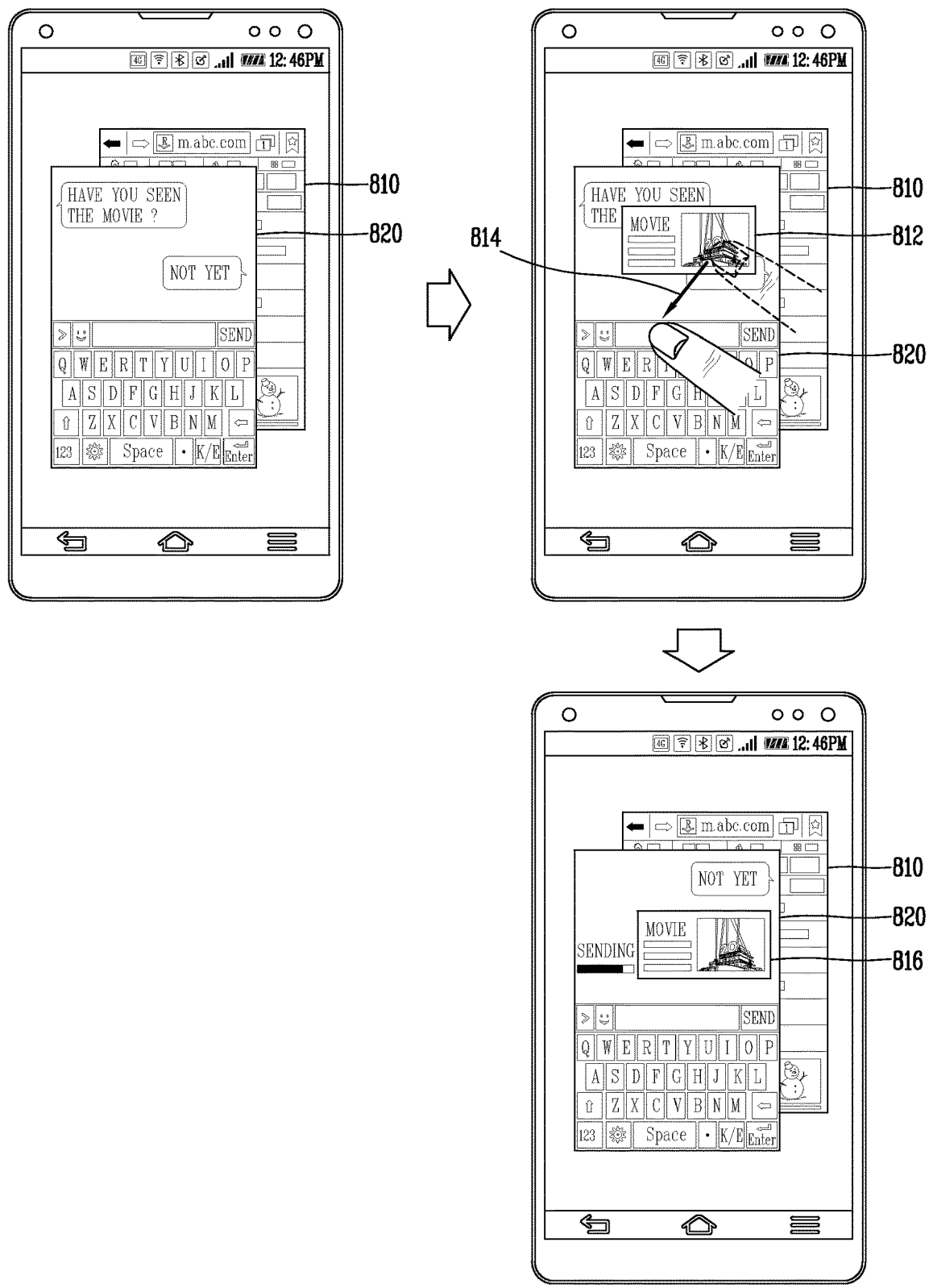
FIGS. 8A and 8B are conceptual views illustrating an exemplary embodiment in which transparency is adjusted according to searching of an object related to an object being output.
Figure 8B:
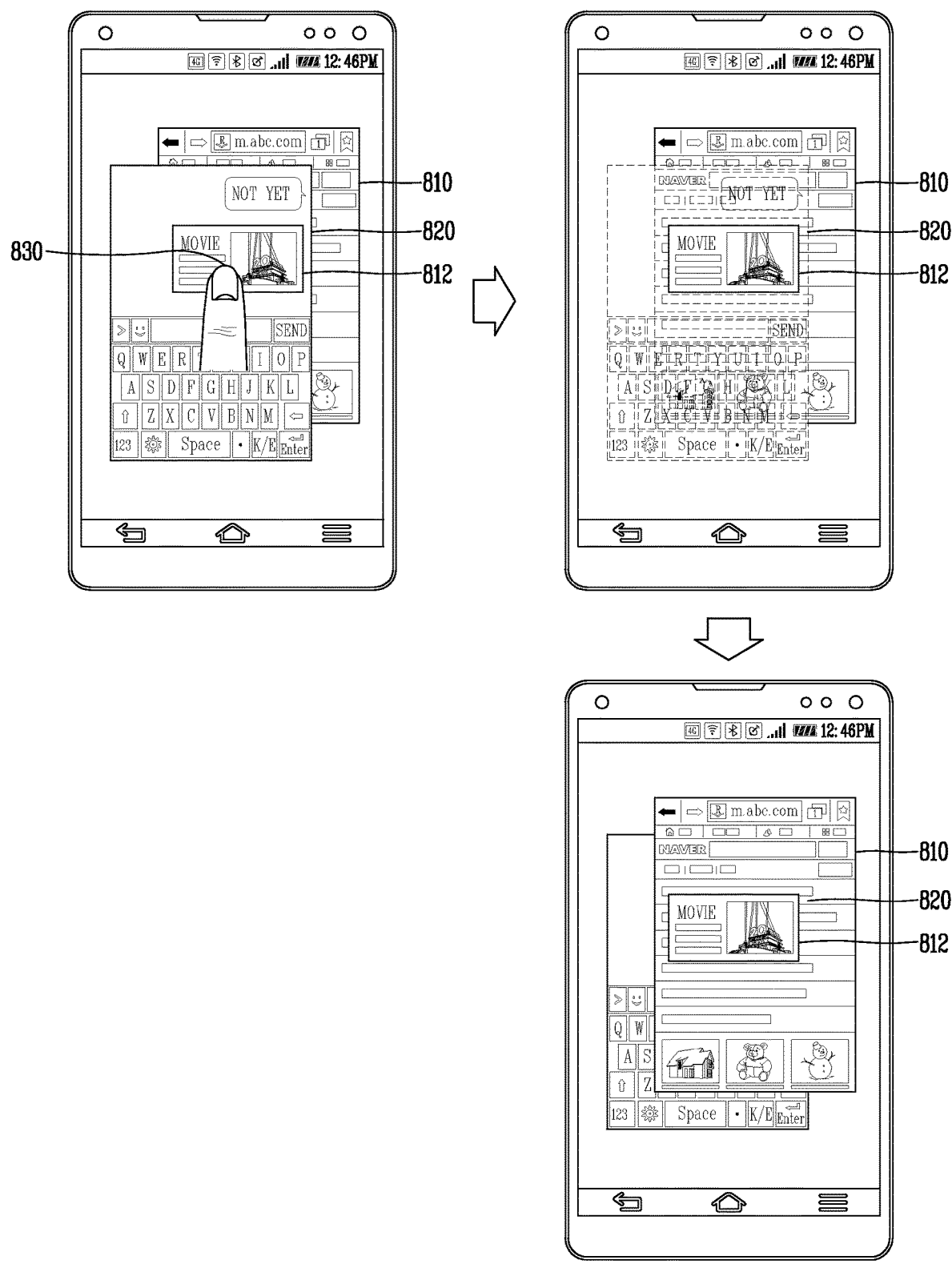

FIGS. 8A and 8B are conceptual views illustrating an exemplary embodiment in which transparency is adjusted according to searching of an object related to an object being output.

Referring to FIG. 8A, a first screen 810 including an Internet execution screen and a second screen 820 including an execution screen of the messenger application as a higher screen than the first screen 810 may be output.

An object related to an object output on the second screen 820 may be detected from the first screen 810. In detail, contents which are the same as, similar to, or associated with a word or an image included in messenger conversation in the second screen 820 may be detected from Internet search contents in the first screen 810.

A keyword may be extracted from the messenger conversation on the second screen 820. The keyword may be a preset word or may be extracted based on the number mentioned in the messenger conversation.

In an exemplary embodiment, "movie" frequently mentioned in the messenger conversation may be selected as a keyword and information 812 related to "movie" may be detected from the Internet search contents included in the first screen 810. The information 812 related to "movie" may be information related to the same movie as the movie mentioned in the messenger conversation or may be information related to a different movie or information related to an actor.

Transparency of the second region of the second screen 820 covering the first region of the first screen 810 on which the information 812 related to the detected movie is output may be increased and the information 812 related to the movie may be clearly displayed.

Also, in another exemplary embodiment when transparency of the second screen 820 has been increased, transparency of the second region of the second screen 820 covering the first region may be further increased and the information 812 related to movie may be clearly displayed.

Also, in another exemplary embodiment when transparency of the first screen 810 and transparency the second screen 820 have been increased, the transparency of the first region may be lowered and the information 812 related to movie may be clearly displayed.

Alternatively, transparency of the first region may be lowered and transparency of the second region covering the first region may be increased and the information 812 related to movie may be clearly displayed. That is, based on the transparency of the entirety of each of the current screens, transparency of screen portions may be adjusted.

Subsequently, the user may apply a drag input 814 to the information 812 related to "movie" clearly displayed and toward a message input window. Accordingly, the information 812 related to "movie" may be transmitted to the conversation counterpart. In an exemplary embodiment, the information related to "movie" may be transmitted as text or an image file 816 to the conversation counterpart.

In another exemplary embodiment, referring to FIG. 8B, the first screen 810 including an Internet execution screen and a second screen 820 including an execution screen of the messenger application as a higher screen than the first screen 810 may be output. As an object related to a frequently mentioned keyword in the messenger conversation on the second screen 820, such as information 812 related to "movie" output on the first screen 810, may be clearly displayed.

Subsequently, the user may apply a long touch input 830 to the information 812 related to the clearly displayed movie. Accordingly, as illustrated in the upper right side of FIG. 8B, transparency of the entirety of the second screen 820 is increased and the messenger conversation and the Internet search contents may be checked (or read).

Also, in another exemplary embodiment, as illustrated in the lower left side of FIG. 8B, the upper and lower relationship of the first screen 810 and the second screen 820 may be changed. The first screen 810 is output as a higher screen than the second screen 820 and covers a portion of the second screen 820.

In another exemplary embodiment, an object detected as a keyword from the second screen 820 may be automatically searched from the first screen 810 including the Internet execution screen with the search result clearly displayed by adjusting transparency according to the schemes previously described above.

The mobile terminal and the control method thereof according to exemplary embodiments of the present disclosure have the following advantages.

According to at least one of the exemplary embodiments of the present invention, a user interested portion of contents in overlapped window screens may be displayed.

Also, according to at least one of the exemplary embodiments of the present invention, there is no need to adjust transparency of the entire screen window.

As a result, user convenience can be enhanced.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a display configured to display a first screen and a second screen, the second screen overlapping at least a portion of the first screen, wherein the second screen has a layer that is higher than a layer of the first screen,
wherein the first screen includes an Internet execution screen and the second screen includes an execution screen of a messenger application which is displayed in response to an occurrence of an event; and
a controller configured to:
extract a keyword from a conversation of the messenger application on the second screen;
detect information related to the keyword is included in content of the Internet execution screen on the first screen and detect a first region that is a part of the first screen on which the detected information is displayed;
detect, from the second screen, a second region, that is a part of the second screen covering the detected first region; and
control a transparency of the second region so that the first region, which is a part of the first screen, is displayed to be identifiable through a part of the second screen.

2. The mobile terminal of claim 1, wherein the event comprises receiving a message.

3. The mobile terminal of claim 1, wherein the event comprises receiving a user input for displaying the first object,
wherein the first object is an object displayed on the second screen, and is related to at least one object among objects displayed on the first screen, and
wherein the controller extracts the keyword from the first object, when the first object is selected.

4. The mobile terminal of claim 3, wherein the first screen comprises a first plurality of regions and the second screen comprises a second plurality of regions, and the controller is further configured to:
cause the display to display a plurality of objects respectively within the first plurality of regions and a plurality of objects respectively within the second plurality of regions, in response to the occurrence of the event,
wherein each of the second plurality of regions overlap each of the first plurality of regions; and
wherein the controller is further configured to control a transparency of some of the second plurality of regions.

5. The mobile terminal of claim 1, wherein the event comprises receiving a user input for creating a message.

6. The mobile terminal of claim 1, wherein the controller is further configured to:
cause the display to display a second object within a third region that is a part of the second screen different from the second region;
control at least one of a transparency of a fourth region that is a part of the first screen different from the first region or a transparency of the third region, in response to a user input selecting the second object; and
cause the display to display a third object within the fourth region and within the third region, in further response to the user input selecting the second object, wherein the third object is related to the second object.

7. The mobile terminal of claim 1, wherein the event comprises application of a first touch input to a region of overlap between the first screen and the second screen.

8. The mobile terminal of claim 7, wherein the controller is further configured to:
execute a control operation corresponding to a second touch input to the region of overlap between the first screen and the second screen.

9. The mobile terminal of claim 1, wherein the controller is further configured to:
cause the display to display a second object on the first region of the first screen.

10. The mobile terminal of claim 9, wherein the controller is further configured to:
detect a touch input applied to the second object; and
further control at least one of a transparency of the first screen or a transparency of the second screen, in response to the detecting the touch input applied to the second object.

11. The mobile terminal of claim 9, wherein the controller is further configured to:
control the transparency of the first region of the first plurality of regions and the transparency of the second region of the second plurality of regions, in response to the occurrence of an event associated with the first screen.

* * * * *